United States Patent
London et al.

(10) Patent No.: US 8,956,123 B2
(45) Date of Patent: Feb. 17, 2015

(54) SMALL SCALE HIGH SPEED TURBOMACHINERY

(75) Inventors: Adam P. London, San Francisco, CA (US); Lloyd J. Droppers, San Francisco, CA (US); Matthew K. Lehman, Santa Cruz, CA (US); Amitav Mehra, Arlington, VA (US)

(73) Assignee: Ventions, LLC, San Francisco, CA (US)

( * ) Notice: Subject to any disclaimer, the term of this patent is extended or adjusted under 35 U.S.C. 154(b) by 740 days.

(21) Appl. No.: 13/036,852

(22) Filed: Feb. 28, 2011

(65) Prior Publication Data

US 2011/0211972 A1    Sep. 1, 2011

Related U.S. Application Data

(60) Provisional application No. 61/308,880, filed on Feb. 26, 2010.

(51) Int. Cl.
*F04D 29/38* (2006.01)
*F01D 5/02* (2006.01)
*F01D 5/14* (2006.01)

(52) U.S. Cl.
CPC ........... *F01D 5/028* (2013.01); *F01D 5/147* (2013.01); *B23P 2700/12* (2013.01); *F05D 2230/14* (2013.01); *F05D 2230/50* (2013.01); *F05D 2250/82* (2013.01)
USPC .................................................. 416/229 A

(58) Field of Classification Search
USPC ............... 416/229 A, 198 R, 198 A; 417/407
See application file for complete search history.

(56) References Cited

U.S. PATENT DOCUMENTS

| | | | |
|---|---|---|---|
| 2,618,462 A * | 11/1952 | Kane | 416/96 R |
| 3,728,857 A | 4/1973 | Nichols | |
| 3,914,070 A * | 10/1975 | Straniti | 416/201 R |
| 3,927,952 A * | 12/1975 | Kirby | 416/95 |
| 4,067,665 A * | 1/1978 | Schwartzman | 417/245 |
| 4,270,883 A | 6/1981 | Corrigan | |
| 5,049,045 A | 9/1991 | Oklejas et al. | |
| 5,342,171 A * | 8/1994 | Stanko | 415/228 |
| 5,433,280 A | 7/1995 | Smith | |
| 6,264,424 B1 * | 7/2001 | Fuller | 415/9 |

(Continued)

OTHER PUBLICATIONS

Amit et al (Journal of Microelectromechanical Systems, vol. 9, No. 4, Dec. 2000, pp. 517-527).*

(Continued)

*Primary Examiner* — Edward Look
*Assistant Examiner* — Juan G Flores
(74) *Attorney, Agent, or Firm* — Neal Gerber & Eisenberg LLP

(57) ABSTRACT

A small scale, high speed turbomachine is described, as well as a process for manufacturing the turbomachine. The turbomachine is manufactured by diffusion bonding stacked sheets of metal foil, each of which has been pre-formed to correspond to a cross section of the turbomachine structure. The turbomachines include rotating elements as well as static structures. Using this process, turbomachines may be manufactured with rotating elements that have outer diameters of less than four inches in size, and/or blading heights of less than 0.1 inches. The rotating elements of the turbomachines are capable of rotating at speeds in excess of 150 feet per second. In addition, cooling features may be added internally to blading to facilitate cooling in high temperature operations.

5 Claims, 25 Drawing Sheets

(56) References Cited

U.S. PATENT DOCUMENTS

| | | | |
|---|---|---|---|
| 6,392,313 B1 | 5/2002 | Epstein | |
| 6,866,478 B2 * | 3/2005 | Fabian et al. | 415/198.1 |
| 7,153,096 B2 * | 12/2006 | Thompson et al. | 415/200 |
| 7,247,001 B2 * | 7/2007 | Kajiwara et al. | 416/186 R |
| 8,622,706 B2 * | 1/2014 | Burgess et al. | 416/185 |
| 2006/0140791 A1 | 6/2006 | Deming et al. | |
| 2007/0231153 A1 | 10/2007 | Beckford et al. | |

OTHER PUBLICATIONS

International Preliminary Report on Patentability, PCT Application No. PCT/US2011/026522, May 14, 2012, 8 pages.

Journal of Microelectromechanical Systems, "A Six-Water Combustion System for a Silicon Micro Gas Turbine Engine", vol. 9, No. 4, Dec. 2000.

PCT International Search Report and Written Opinion, PCT Application No. PCT/US2011/026522, Jul. 1, 2011, 12 pages.

* cited by examiner

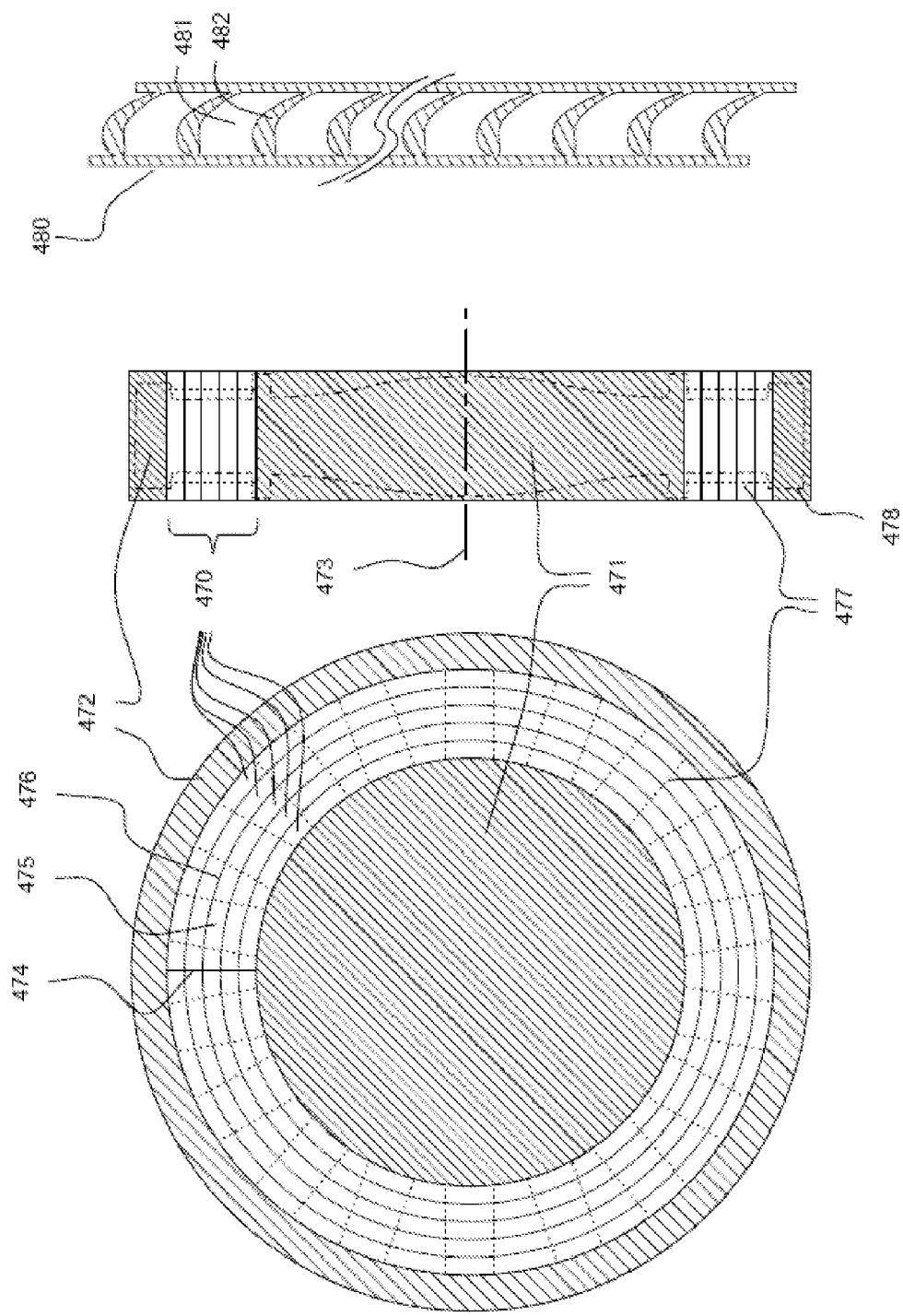

SMALL SCALE HIGH SPEED TURBOMACHINERY

CROSS REFERENCE TO RELATED APPLICATIONS

This application claims the benefit of U.S. Provisional Application No. 61/308,880, filed Feb. 26, 2010, the content of which is incorporated by reference herein in its entirety.

GOVERNMENT LICENSE RIGHTS

This invention was made with government support under National Aeronautics and Space Administration (NASA) Phase II Small Business Innovation Research (SBIR) contract NNX1OCA89C. The government has certain rights in this invention.

BACKGROUND

This application relates to turbomachinery and in particular to high speed, small scale turbomachinery.

High-speed turbomachinery is used in many applications, including high pressure liquid centrifugal pumps, high-speed centrifugal gas compressors, gas turbines, liquid turbines, rocket turbopumps, car-engine turbochargers, aircraft auxiliary power units, jet engines, and stationary power generation devices. These devices usually include one or more rotating devices that transmit power from a rotating shaft into a working fluid, increasing the energy contained in the working fluid, or extract power from a working fluid and transfer that power into a rotating shaft, reducing the energy contained in the working fluid.

Turbomachines typically have rotating elements with outer diameters in the range of 3 inches (for turbochargers) up to several feet (for large jet engines, steam turbines, or hydroelectric turbines). However, similar devices have generally not been successfully designed or constructed that can operate at high speeds when the outer diameters of the rotating elements are one and a half inches or smaller. Design of devices in this size range has not succeeded, in part, because it is not currently possible to manufacture turbomachines with the precision and small features required to maintain high performance operation at these scales and speeds.

SUMMARY

To enable a small scale, high speed turbomachine, embodiments of the invention include turbomachine designs and techniques for manufacturing the turbomachine. The turbomachine is manufactured by bonding stacked sheets of metal foil, each of which has been pre-formed to correspond to a cross section of the turbomachine structure. The turbomachines include rotating elements that are capable of operating at tip speeds in excess of 150 feet per second. Using this process, turbomachines may be manufactured with rotating elements that have outer diameters of less than four inches in size, and/or blading heights of less than 0.1 inches.

The turbomachines may also include static structures, which may be added after bonding through machining, or also created through the same stacked sheet bonding process. Embodiments of the invention also include designs for integrated cooling components to assist in bringing down the operating temperature of a turbomachine, as well as labyrinth seals that may be used, optionally, in conjunction with turbomachines of any size.

BRIEF DESCRIPTION OF THE DRAWINGS

FIGS. 4i and 4j illustrate example cross sections of a rotating element of a turbomachine made from stacking metal foil sheets in circumferential layers around the axis of rotation, in accordance with one embodiment.

FIG. 4k illustrates a portion of a typical circumferential sheet, in accordance with one embodiment.

The FIGs. depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Turbomachine Elements

Figure 1:
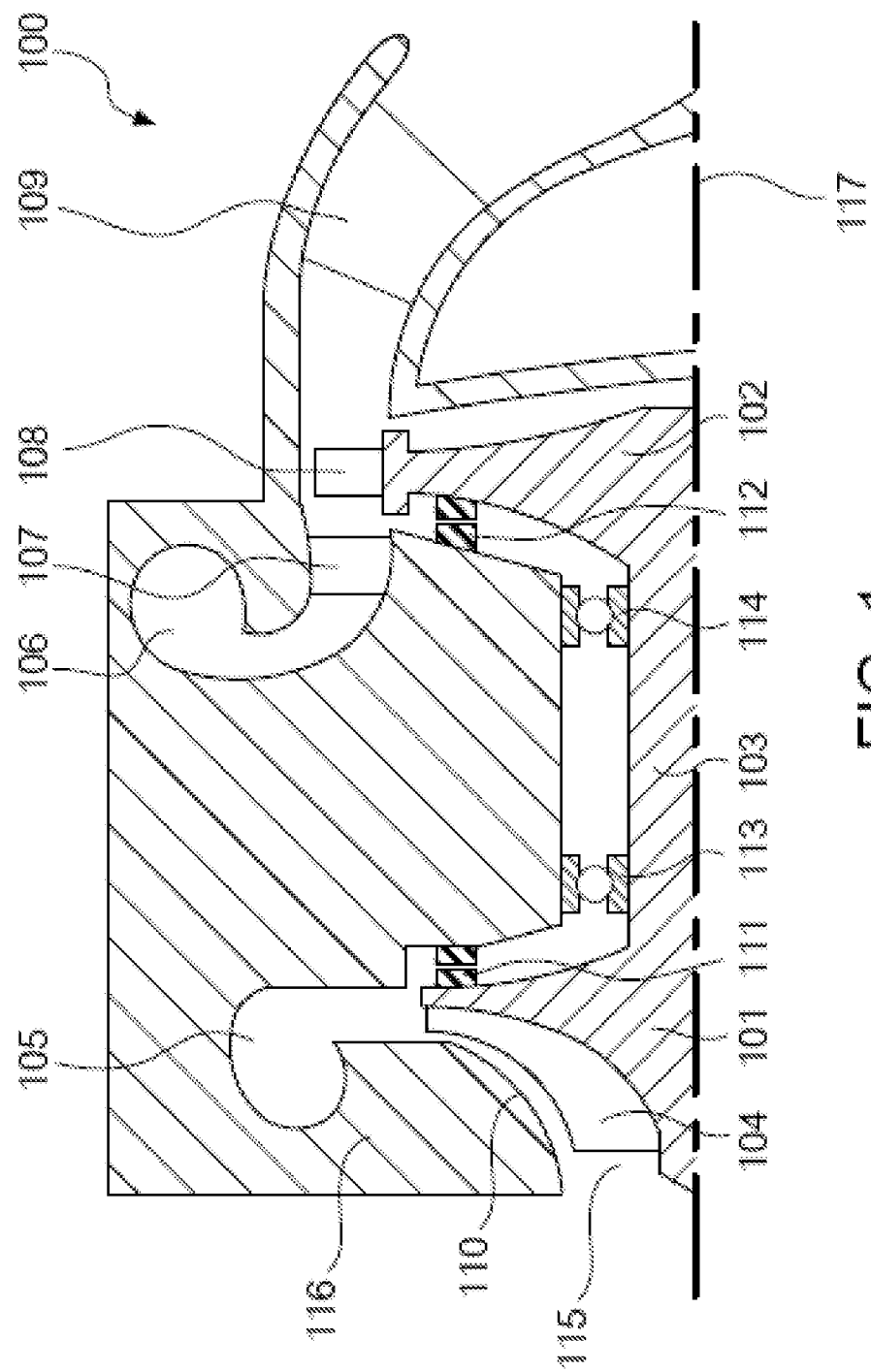
FIG. 1 illustrates a cross sectional view of a turbomachine.

FIG. 1 illustrates a cross sectional view of a turbomachine. The turbomachine 100 includes a first rotating element 101 that increases the enthalpy of the working fluid that passes through it. An example of a first rotating element 101 may be a compressor, pump, or impeller, and may include additional stages or an inducer. For simplicity, the first rotating element 101 will be referred to herein as a pump. The pump 101 is powered by a second rotating element 102 that decreases the enthalpy of the turbine drive fluid that passes through it. An example of a second rotating element is a turbine. For simplicity, the second rotating element 102 will be referred to as a turbine.

Turbine 102 powers pump 101 via a shaft 103. Typically, pump 101, turbine 102, and the shaft 103 are different physical components. The working fluid enters the turbomachine at the entrance 115, passes through blading 104, and is collected in exit device 105. The turbine drive fluid enters at inlet 106, passes through turbine inlet guide vanes 107, passes through turbine blading 108, and exits after passing by one or more struts 109.

In existing turbomachines, there is a often a close clearance 110 between the blading 104 of pump 1 and the external housing 116. The close clearance 110 forms a forward seal. The forward seal minimizes leakage or errant flow of the increased pressure fluid from the exit device 105 back into the incoming working fluid. Rear seal 111 minimizes leakage from the exit device 105 of pump 101. Similarly, rear seal 112 minimizes leakage from turbine flow path. Bearings 113 and 114 allow the pump 101 and turbine 102 and shaft 103 to rotate at high speed while still remaining centered on the centerline axis 117.

In existing turbomachines, rotating elements are typically assembled from multiple components that are mechanically fastened together, these components typically including multiple individual blades and a mounting disk. In some cases the rotating element may be a single piece. The individual components or singe piece element are typically machined from single pieces of material or cast to near-final shape and then machined to final shape. Turbomachines have complicated internal geometries. In order to meet standard turbomachine efficiencies, the geometries of the rotating elements are precisely configured. For example, the shape of the blading and fluid flow paths is carefully selected to achieve the design performance goals of the machine, and changes to the shape will often reduce performance. As another example, variance in the clearance between the blading of a rotating element and the external housing or any added shrouding may affect the efficiency of the turbomachine.

In most turbomachines, the smallest clearance that is feasible to manufacture and maintain during operations is preferred to maximize efficiency and performance. In many cases, if it is feasible to manufacture the turbomachine with a co-rotating shroud such that there is zero clearance, this is done. However, in some types of turbomachines, usually compressors or pumps, a small clearance between the blading and the casing allows some amount of leakage flow between the higher and lower pressure side of the blades, which can increase turbomachine efficiency relative to a shrouded design. Too much or too little flow decreases efficiency. Further, temperature changes may cause the material making up either or both of the rotating element and the stationary casing to expand or contract, changing the clearance between the two and therefore the performance of the turbomachine.

Some turbomachines include shrouds in between the housing and the rotating element in order to maintain the efficiency of the turbomachine. Some large scale turbomachines make use of shrouding to balance out axial thrust, which can cause problems at the higher pressures readily achieved by larger turbomachines pumping high density fluids such as liquids. As the pressure on the rotating element goes up (e.g., 500 psi and higher), shrouding can improve the balance of pressure between the inlet and outlet sides of the rotating element, greatly reducing the axial force on the turbomachine's bearings.

As a turbomachine gets smaller in size, it becomes more difficult to manufacture an efficient turbomachine with a small amount of clearance between the blading of the rotating element and the external housing. In such cases adding a shrouding to eliminate the clearance would improve performance, but at very small sizes, it also becomes more difficult to manufacture a rotating element with an integral shroud using techniques familiar to those skilled in the art. In one embodiment, a small turbomachine and a process for manufacture includes a shrouded rotating element, which allows a relatively large clearance between the outside of the shroud and the stationary casing without substantially reducing the efficiency and performance. The shrouding of the turbomachine increases, rather than decreases, the efficiency and performance of the smaller scale rotating elements. In one embodiment, well-controlled small gaps may be inserted between the co-rotating shrouding and the blading to slightly further improve performance. In one embodiment, the clearance between the blading and the shroud, along more than half the length of the blading in the primary flow direction, is less than five percent of the height of the blading.

In one embodiment, the turbomachine is between 0.5 and 4 inches, inclusive, in rotating element outer diameter. In one embodiment, the turbomachine is between 0.4 and 3 inches, inclusive, in rotating element outer diameter. In one embodiment, a turbomachine is manufactured that comprises a rotating element 1 inch in diameter that rotates at 55,000 RPM and pressurizes water. In various embodiments of the turbomachine, the materials of construction and the shape of the blading will be selected so that a rotating element of the turbomachine is able to rotate at a particular maximum speed. In one embodiment, this maximum speed of a rotating element is greater than 150, 250, 350, 450, 550 or 800 feet per second. In one embodiment, the turbomachine pressurizes a liquid fuel. In one embodiment, the turbomachine pressurizes a liquid oxidizer. In one embodiment, the turbomachine has at least two rotating elements on a common shaft and pressurizes both a liquid fuel and a liquid oxidizer in separate rotating elements. In one embodiment, the turbomachine does not utilize a turbine, but contains at least one rotating element to pressurize a fluid and is powered by a high-speed electric motor. In one embodiment, the turbomachine is a rocket turbopump. In one embodiment, the turbomachine is a gas turbine engine.

In one embodiment, the blading of the rotating elements has height at the outer radius of 0.020 inches or less. In one embodiment, the blading has height at the outer radius of 0.012 inches. In one embodiment, the blading has height of 0.050 inches at the tip. In one embodiment, the blading has height of 0.1 inches at the tip. In one embodiment, the partial gap between the co-rotating shrouding and the blading of the rotating element is less than two percent of the blading height.

In one embodiment, the partial gap between the co-rotating shrouding and the blading of the rotating element is less than one percent of the blading height.

Figure 2A:
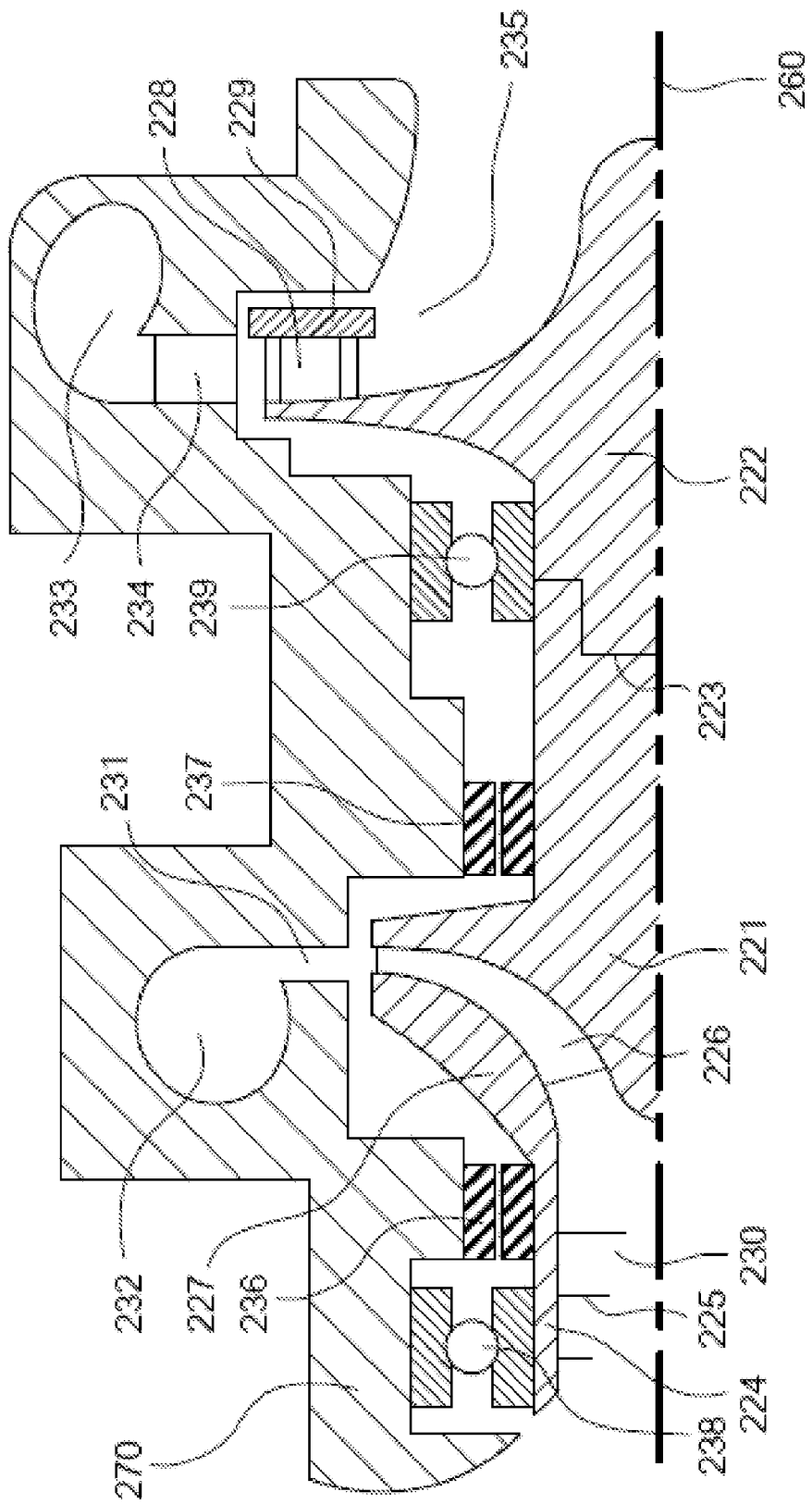
FIG. 2a illustrates a turbomachine with a pump and a turbine, in accordance with one embodiment.
Figure 2B:
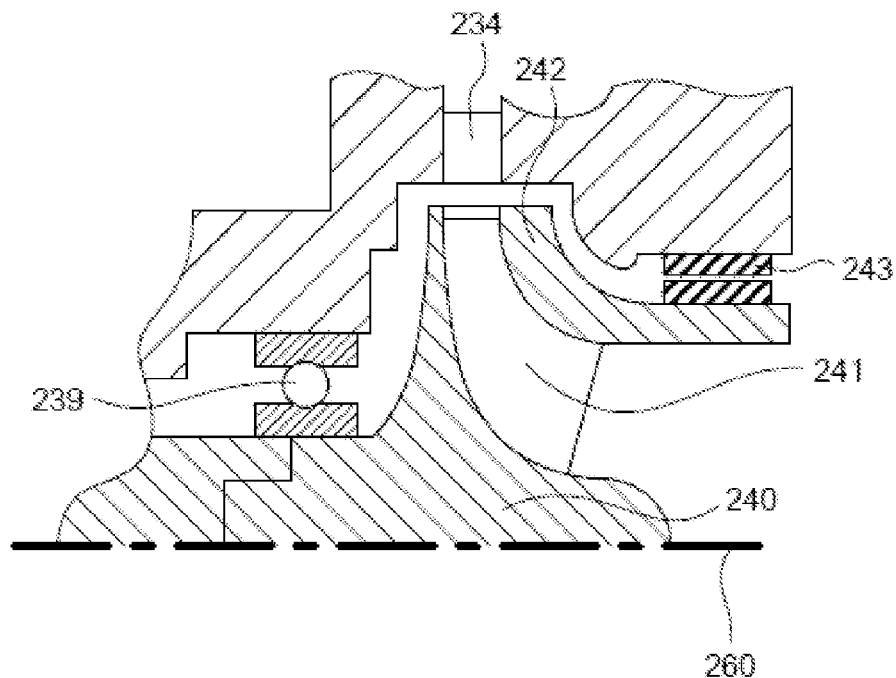
FIGS. 2b and 2c show a turbomachine with two alternate embodiments of a rotating element.
Figure 2C:
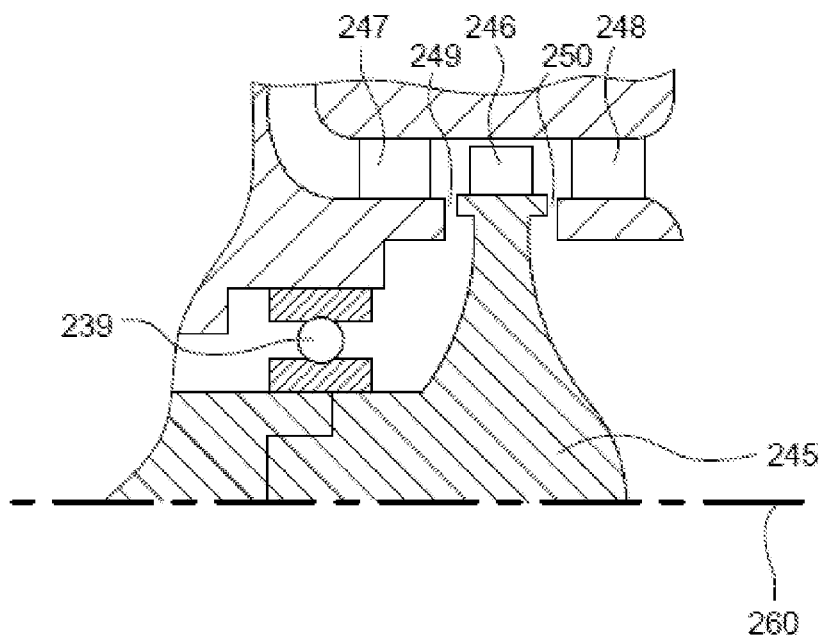

FIGS. 2a-2c illustrate cross sectional views a small scale, high speed turbomachine, in accordance with several embodiments of the invention. FIG. 2a illustrates a turbomachine with a pump 221 and a turbine 222, in accordance with one embodiment. The pump 221 may be a pump or compressor, and may comprise more than one stage. The turbine 222 is a radial-inflow turbine, joined to the pump 221 via a shaft joint 223. In one embodiment, the pump 221 is a single mechanical part, including a hollow shaft 224 next to the entrance 230 where the working fluid is introduced. The entrance 230 feeds into blading 225 and/or 226, and shroud 227. The shroud 227 and hollow shaft 224 eliminate the relatively large gap that would otherwise occur between blading 225 and/or 226 and the turbomachine stationary casing 270. Turbine 222 similarly includes blading 228 and a shroud 229.

In one embodiment, blading 225 within hollow shaft 224 may optionally serve as an inducer to provide initial pressurization of the working fluid in order to limit cavitation at the fluid entrance to blading 226. The pressurized working fluid then passes through the pump blading 226 where it is further pressurized.

The working fluid flows from blading 226 through diffusing section 231. The diffusing section 231 may optionally include stationary blading (not shown). The working fluid is collected in exit passages 232 for distribution as an input to an engine (not shown), for example to a rocket engine.

Turbine inlet chamber 233 receives a turbine drive fluid from a source, for example an engine. Turbine inlet chamber 233 accelerates the drive fluid through turbine inlet guide vanes 234 and through turbine blading 228. The acceleration of the drive fluid through blading 228 extracts power which is transmitted through shaft joint 223 back to pump 221. The drive fluid collects at exit location 235, and may be provided back to the engine for further use or removed as exhaust.

In one embodiment, the turbomachine includes two or more bearings 238 and 239. The bearings 238 and 239 may be bearings of conventional size, and do not need to be reduced in size to match the smaller scale of embodiments of the turbomachine. In one embodiment, the turbomachine includes two or more seals 236 and 237 in order to prevent leakage of working fluid outside the device or to other areas of the device, for example at the exit 232 of the pump. This is particularly beneficial if the working fluid is under high pressure.

FIGS. 2b and 2c show two alternate embodiments of turbine 222. In the embodiment of FIG. 2b, turbine 240 includes extended radial inflow blading 241 and an extended shroud 242 permitting the addition of axial seal 243 to turbine 222. The additional axial seal 243 prevents leakage of turbine drive fluid outside the device or to other areas of the device. The extended blading 241 allows for a more gradual extraction of energy from the working fluid, which could improve the efficiency of the turbine relative to turbine 222 with non-extended blading 228.

In the embodiment of FIG. 2c, axial-flow turbine 245 includes axial flow blading 246, axial flow turbine inlet guide vanes 247 and exit vanes 248, as well as two additional seals 249 and 250 to turbine 222. The additional seals 249 and 250 prevent leakage of turbine drive fluid outside the device or to other areas of the device. This embodiment may allow for higher speed operation than turbine 222 since the blading 245 is radially outward from the turbine disk, while blading 228 is cantilevered off of the disk of turbine 222. This embodiment is also more suited towards including an additional turbine stage or stages following stationary blading 248.

Process for Manufacturing Turbomachines

FIGS. 3, 4a through 4k, 5, and 6 illustrate a process for manufacturing elements of a small scale, high speed turbomachine, according to one embodiment. The process of manufacture has no inherent limit on the lower bound for either of the rotating elements or the blading heights of those rotating elements. In addition to manufacturing the rotating elements, the process is also able to manufacture stationary elements of the turbomachine.

Traditional techniques for building turbomachines at small sizes run into problems when trying to manufacture turbomachines with sufficient precision, for example for the blading clearance between blading and a shroud or housing. In order to construct a small scale turbomachine as described above, the process includes diffusion bonding or brazing of separate metal foil sheets, each etched with a thin cross section of the structure of a rotating element of a turbomachine.

Figure 3:
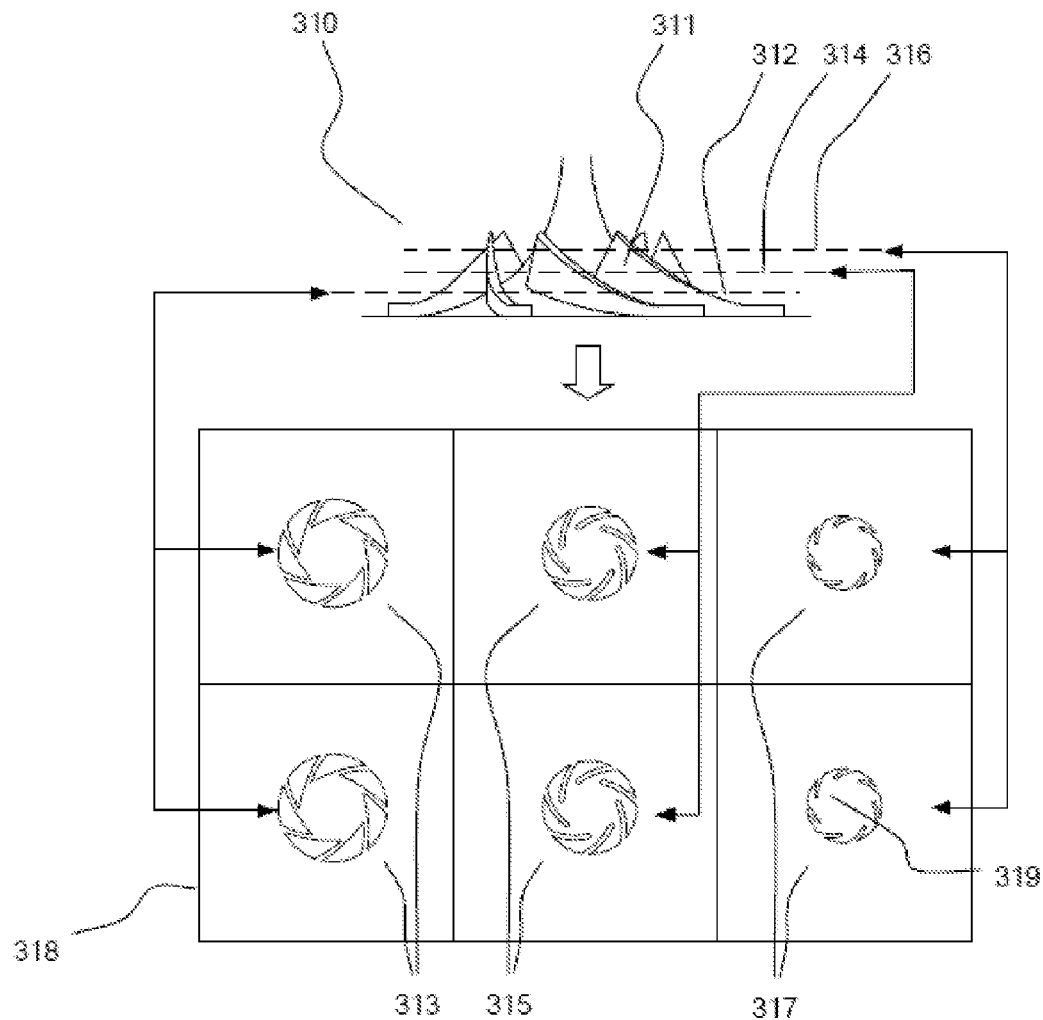
FIG. 3 illustrates a sample three dimensional model of a rotating element, and a sample set of etched metal foil sheets matching three different cross sections of the sample rotating element at different locations along the axis, according to one embodiment.

FIG. 3 illustrates a sample three dimensional model of a rotating element 310, and a sample set of etched metal foil sheets 318 matching three different cross sections 312, 314, 316 of the sample rotating element at different locations perpendicular to its axis of rotation, according to one embodiment. The three dimensional model 310 is shown with its shrouding removed so that individual blades 311 may be seen. The metal foil sheets are thin slices of material pre-formed to have shapes of two dimensional slices of the turbomachine cut or etched into them, such that sheets 313 correspond to axial location 312; and sheets 315 correspond to axial location 314, and sheets 317, with blading 319, correspond to axial location 316. The metal foil sheets may be pre-formed by chemical etching, or by other methods such as machining, water-jet cutting, or laser-cutting. Other methods of pre-forming may be used as well. Once sheets are pre-formed, the final blading is formed by stacking (or layering) the metal foil sheets on top of one another in a properly aligned fashion, and then bonding the sheets together. In one embodiment, the sheets are between 0.0001 and 0.032 inches thick, inclusive.

Figure 4A:
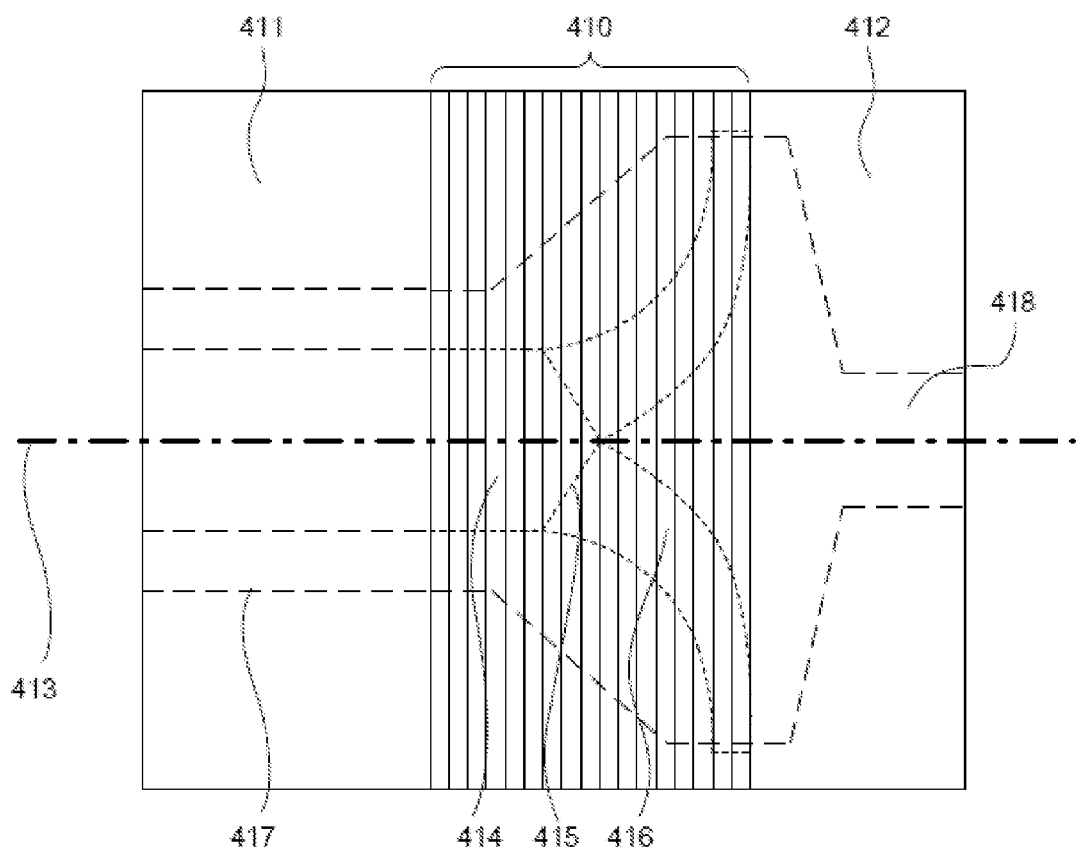
FIGS. 4a and 4b illustrate example cross-sections of turbomachine rotating elements manufactured by stacking metal foil sheets that are perpendicular to the rotation axis, in accordance with one embodiment.
Figure 4B:
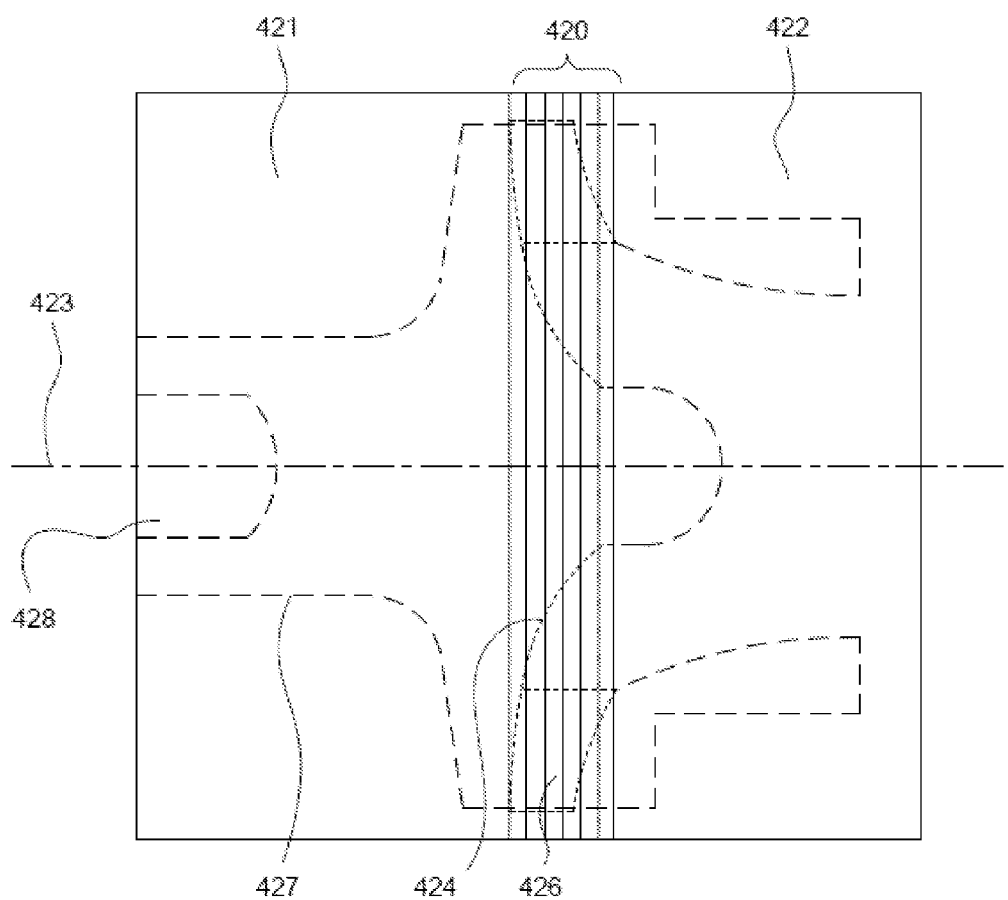

FIGS. 4a and 4b illustrate example cross-sections of rotating elements of a turbomachine manufactured by stacking metal foil sheets such that the sheets form planes perpendicular to the axis of rotation 413 and 423, in accordance with one embodiment. FIG. 4a depicts a pump impeller of a turbomachine, according to one embodiment. FIG. 4b depicts a radial in-flow turbine rotor of a turbomachine, according to one embodiment, or a radial out-flow turbine rotor, according to another embodiment. In FIGS. 4a and 4b, the layers of pre-formed metal foil sheets 410 and 420 define internal geometries such as blading 416 and 426, as well as the non-bladed center of rotating element 415. Other internal features created using the layers include impeller inlet flow area 414, impeller blading leading edge 415, and turbine outlet hub 424.

In one embodiment, thin layers 410 and 420 are combined with one or more thicker plates such as 411, 412, 421 and 422 on one or both sides of the layers. In this embodiment, these plates 411, 412, 421 and 422 are located in regions of axial extent of the rotating element that do not contain complex internal passages or blading, and can be bonded into position with the thin sheets 410, 420, reducing the total number of sheets that are processed prior to bonding the initial part.

The ordered and stacked cross sections of the turbomachine (or static structures) are fused together into a single part through a bonding process. In one embodiment, the bonding process is a diffusion bonding process. In another embodiment, the bonding process is a brazing process. Machining or other techniques may be used to cut away excess material outside of the final part boundaries 417 and 416 in order to change the shape of the turbomachine rotating element, or expose the internal flow passages, or produce features, e.g. 418 and/or 428 that allow the rotating element to be aligned and coupled to other rotating elements.

Figure 4C:
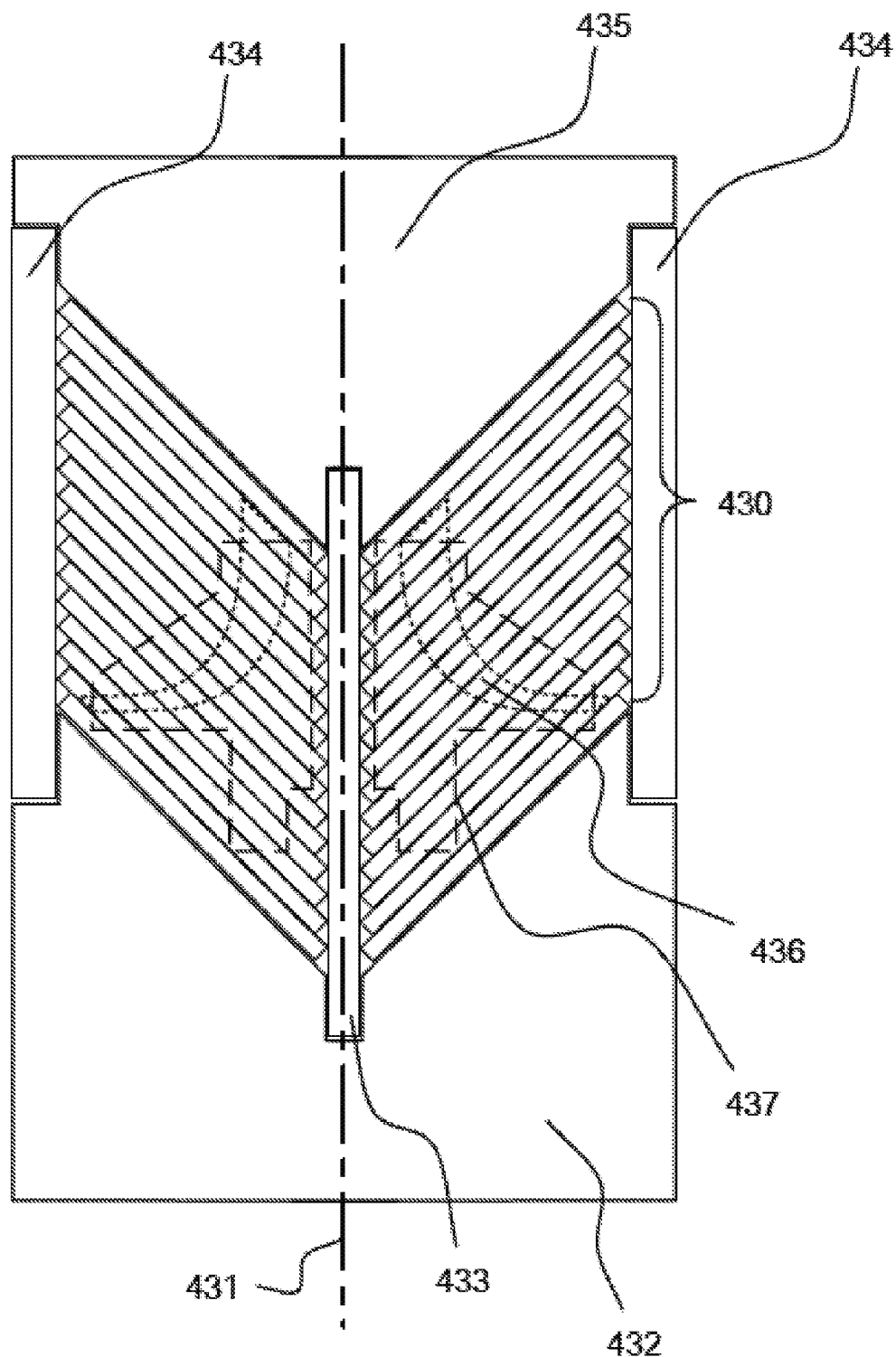
FIGS. 4c and 4d illustrate an example cross sections of a rotating element of a turbomachine manufactured by forming metal foil sheets into conical layers and stacking these layers, according to one embodiment.
Figure 4D:
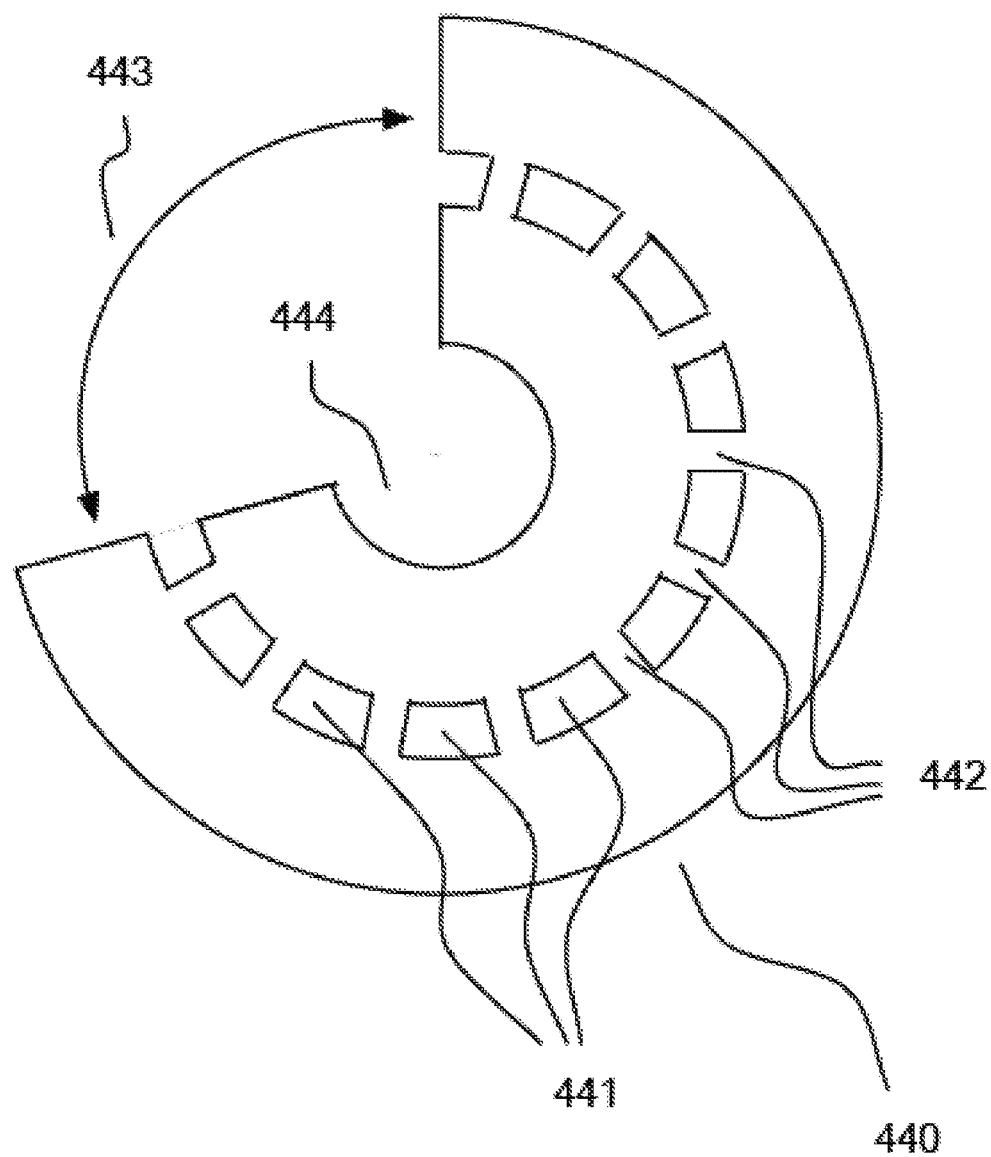

FIGS. 4c and 4d illustrate an example cross section of a rotating element of a turbomachine manufactured by forming metal foil sheets into conical layers and stacking these layers, according to one embodiment. In the example embodiment of FIG. 4c, a rotating element of a turbomachine is manufactured by shaping, forming, and stacking metal foil sheets such that the sheets form partial conical shells where the axes of the shells are coincident with the axis of rotation 431. In one embodiment, the sheets are stacked at an angle that is not 0 or 90 degrees with respect to the axis of rotation. The thin conical shells 430 are formed from flat sheets 440 illustrated in FIG. 4d, according to one embodiment. The flat sheets 440 are pre-formed such that an arc-segment of angle 443 is removed so that as the two edges on either side of angle 443 are brought together, a conical shell is formed. The flat sheets 440 also include center holes 444. The flat sheet includes features 442 that define the solid blading of the eventual rotating element, as well as features 441 that define the fluid flow path between the blades within the eventual rotating element.

In one embodiment, a solid base 432 is shaped to receive the conical shells. The base 432 may be connected to an alignment pin 433 along the rotation axis 431, and an alignment cylinder 434. The alignment pin 433 and alignment cylinder 434 are used to maintain the conical shells in axial alignment while they are stacked to form the internal blading 436. Care is taken to ensure appropriate circumferential alignment of the blading elements, while also ensuring that individual shells are rotated around the axis such that the seams separating angle 443 are distributed circumferentially around the element. Once the shells are in place, a solid top 435, shaped to fit closely to the internal contour of the conical shells is inserted, and the shells can be bonded together. Once the shells are bonded together, excess material can be removed by machining or other means to the final external contour 437 of the element.

Figure 4E:
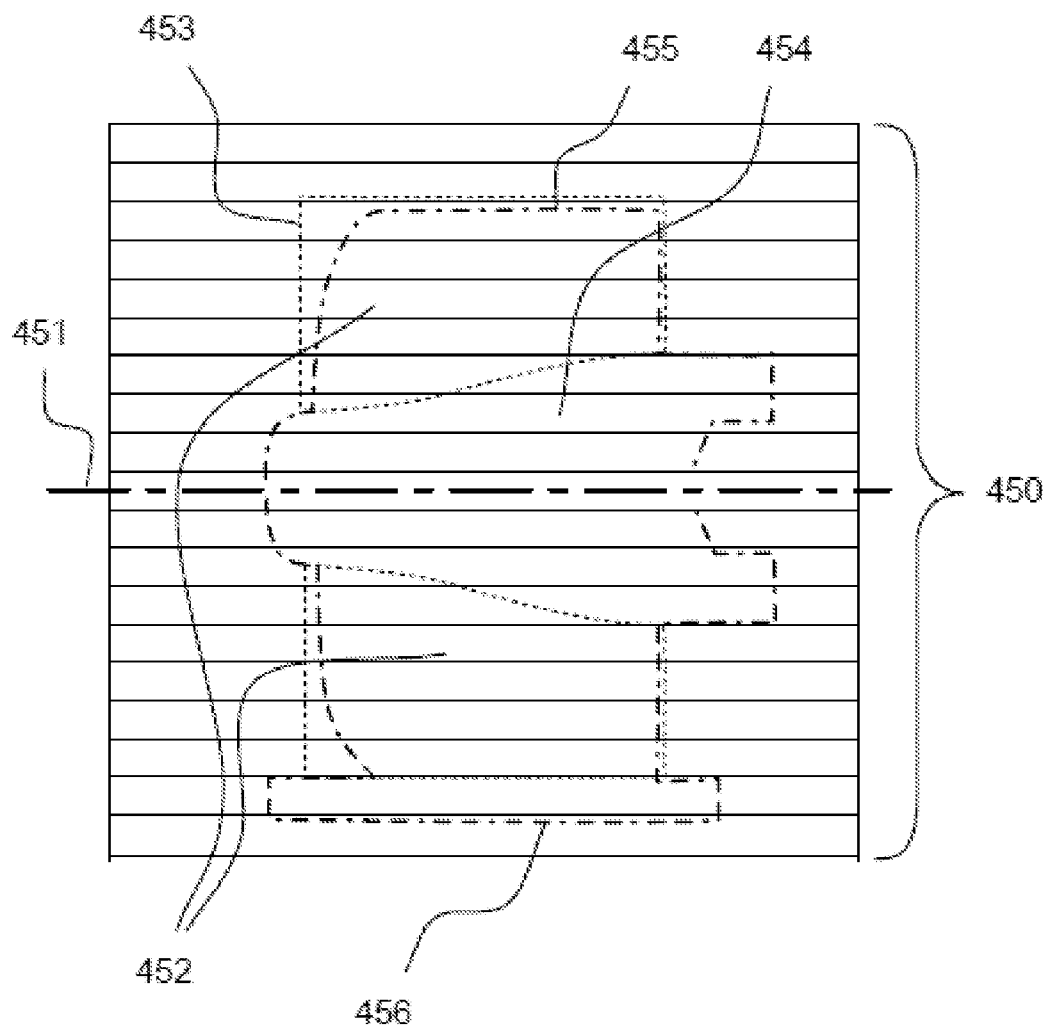
FIGS. 4e and 4f illustrate two example cross-sections of a turbomachine rotating element manufactured by stacking metal foil sheets that are parallel to the rotation axis, in accordance with one embodiment.
Figure 4F:
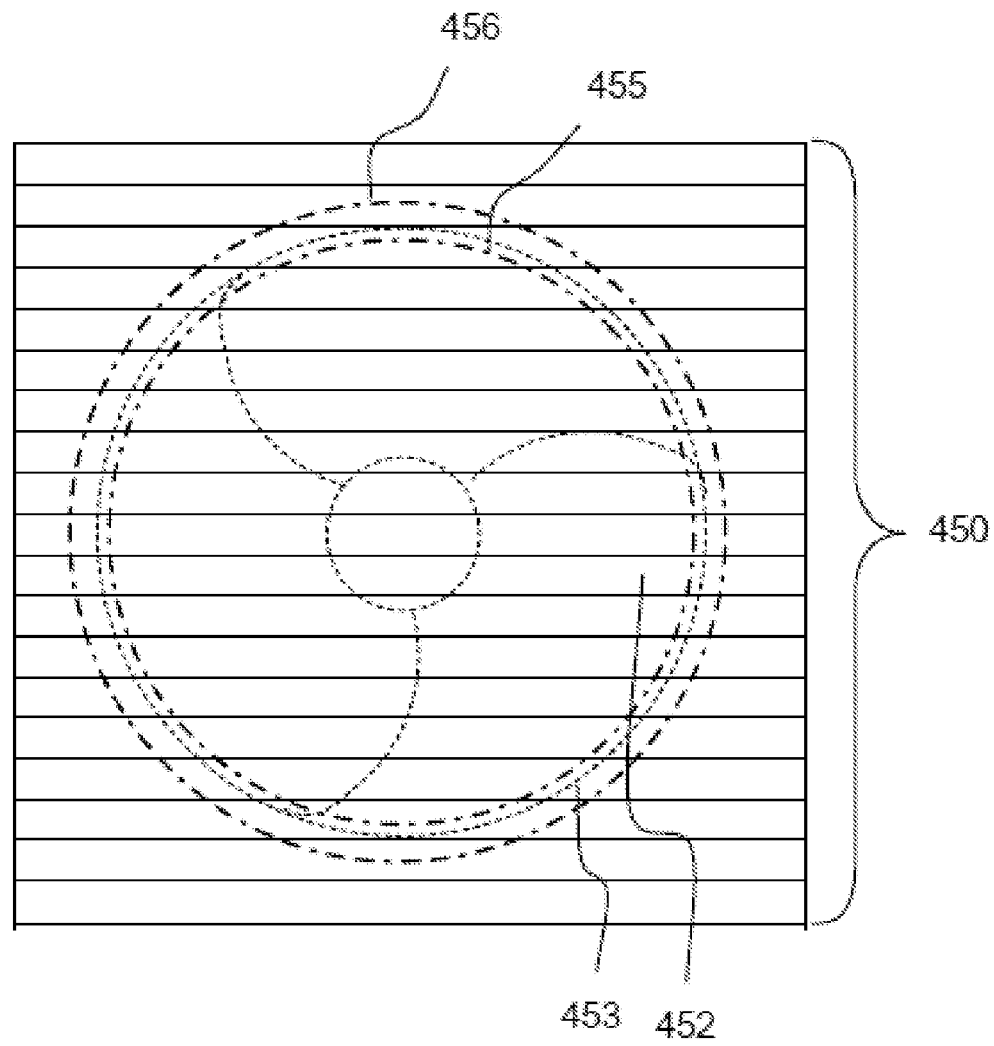

FIGS. 4e and 4f illustrate example cross-sections of a rotating element of a turbomachine manufactured by stacking metal foil sheets 450 such that the sheets 450 form planes parallel to the axis of rotation 451, in accordance with one embodiment. FIG. 4e shows a cross section through the axis of rotation 451, and FIG. 4f shows a cross section perpendicular to the axis of rotation 451. The blading 452 is defined in those layers and locations within the boundary 453, but outside of the boundary of 454 which represents the center non-bladed portion of the rotating element. After the layers are stacked and bonded together, excess material may be removed. In one embodiment, illustrated in FIG. 4f and in the upper half of FIG. 4e, excess material is removed outside of contour 455 to produce a rotating element without a shroud. In another embodiment, illustrated in FIG. 4f and the lower half of FIG. 4e, excess material is removed outside of contour 456 to produce a rotating element with a co-rotating and integral shroud.

Figure 4G:
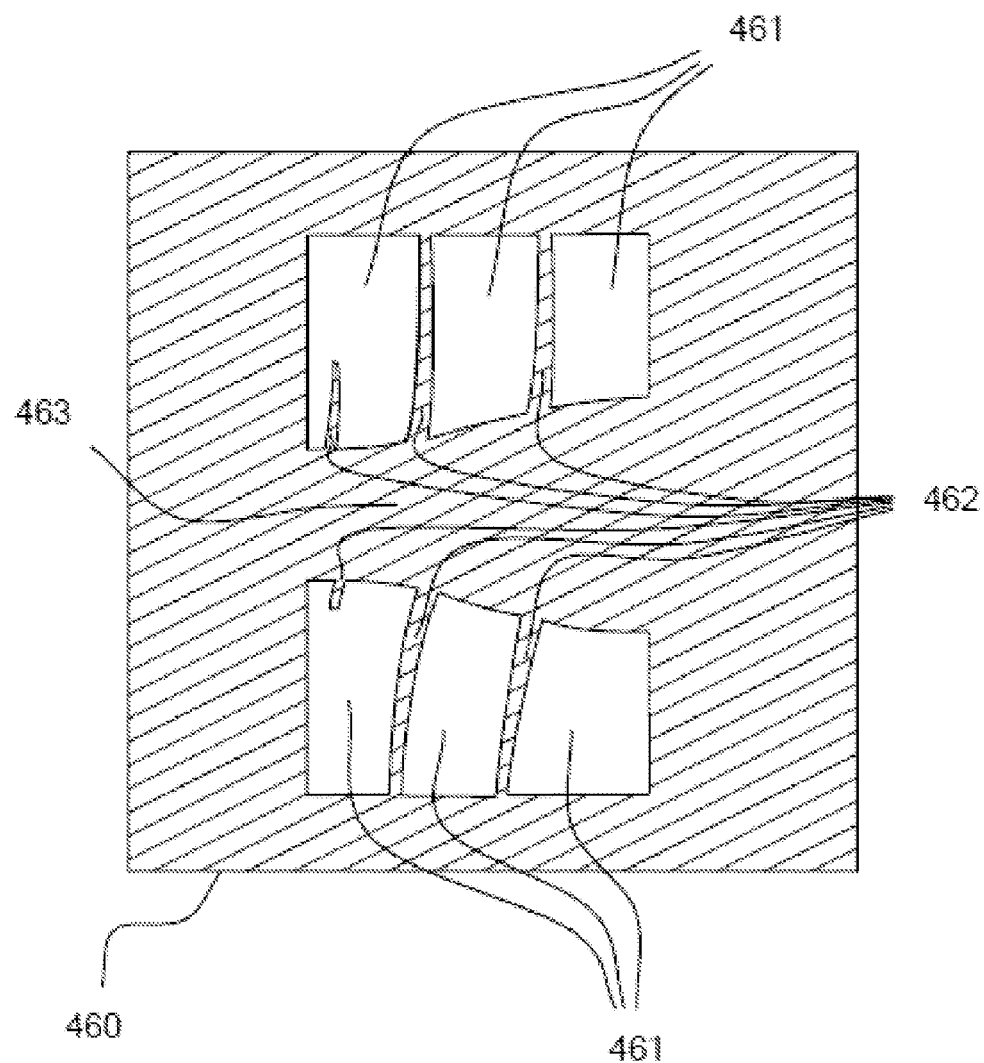
FIG. 4g illustrates an example foil sheet prior to stacking, according to one embodiment.
Figure 4H:
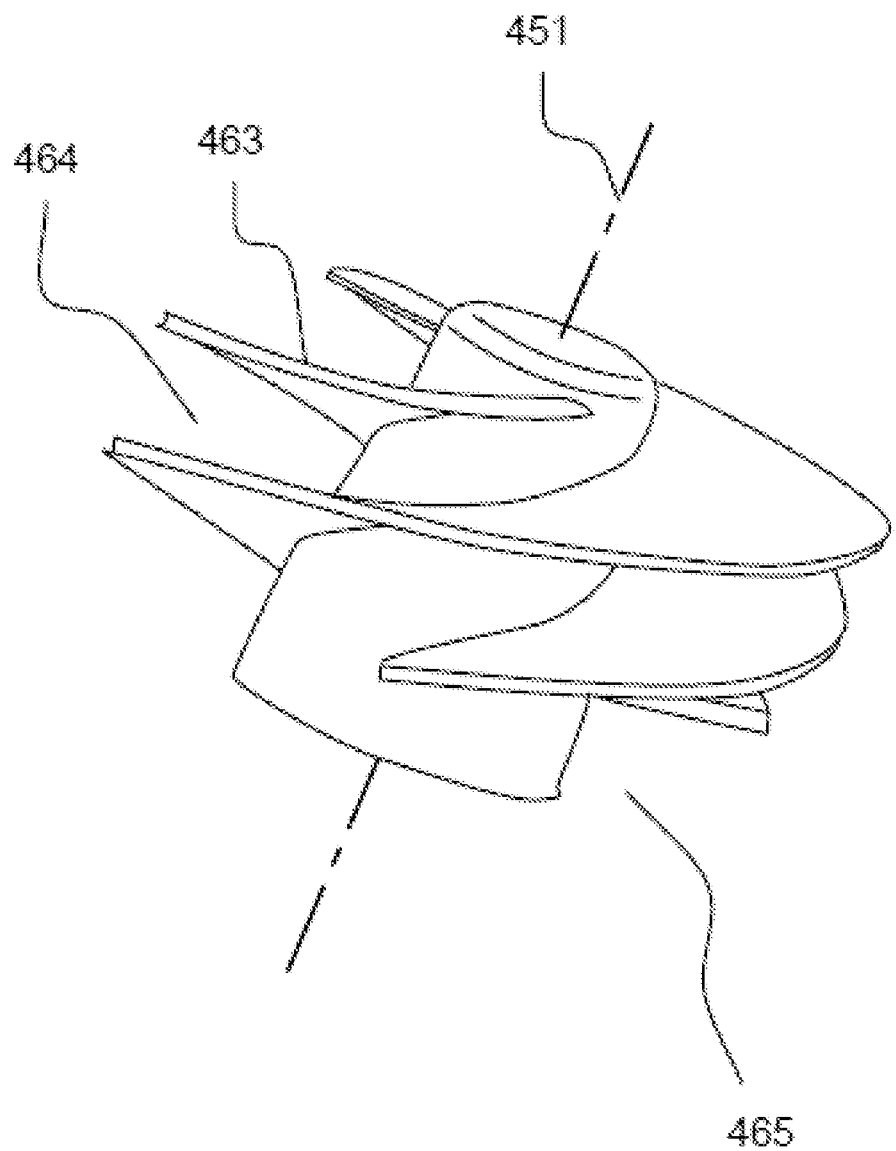
FIG. 4h illustrates a rotating element of a turbomachine after excess material has been removed, whereby the rotating element was made from stacking metal foil sheets that are parallel to the rotation axis, according to one embodiment.

FIG. 4g illustrates a single foil layer from within layers 450, according to one embodiment. Regions 461 are removed to create flow areas, and regions 462 remain to create the blading. Region 463 remains to create the hub of the rotating element. FIG. 4h depicts an shroudless inducer, a rotating element 465 that would result from utilizing contour 455 for removing excess material, according to one embodiment. This inducer includes blading 463, defining flow area 464.

FIGS. 4i and 4j illustrate example cross-sections of a rotating element of a turbomachine manufactured by stacking metal foil sheets 470 such that the sheets form cylindrical shells each concentric with the axis of rotation 473, in accordance with one embodiment. In one embodiment, this rotating element would be an axial-flow turbine. The sheets are wrapped around cylinder 471, such that their ends meet at seam 474 (though in other embodiments the seams of each layer need not be co-incident), and outer solid thick-walled cylinder 472 is placed around the sheets to contain them. Care should be taken to ensure proper alignment of the layers. The sheets and inner and outer cylinders are then bonded together to define blades 475 and flow path areas 476 internal to the structure. Material is then removed to contour 478 to expose the blades and flow areas. FIG. 4k depicts, for one embodiment, the shape of one sheet 480 before it is formed into the cylindrical shell, including blades 482 and flow path 481. In one embodiment, the shape of the blades would be different in each layer to allow for a gradual change in blade incidence and turning angle from the blade hub to blade tip. In one embodiment, the flat sheets may be formed into axisymmetric shells that are neither conical nor cylindrical prior to bonding.

Note that in all subfigures FIG. 4, the thickness of sheets 410, 420, 430, 450, 470 is typically enlarged for clarity and not to scale. Some embodiments would utilize many more sheets than can be illustrated effectively.

Figure 5A:
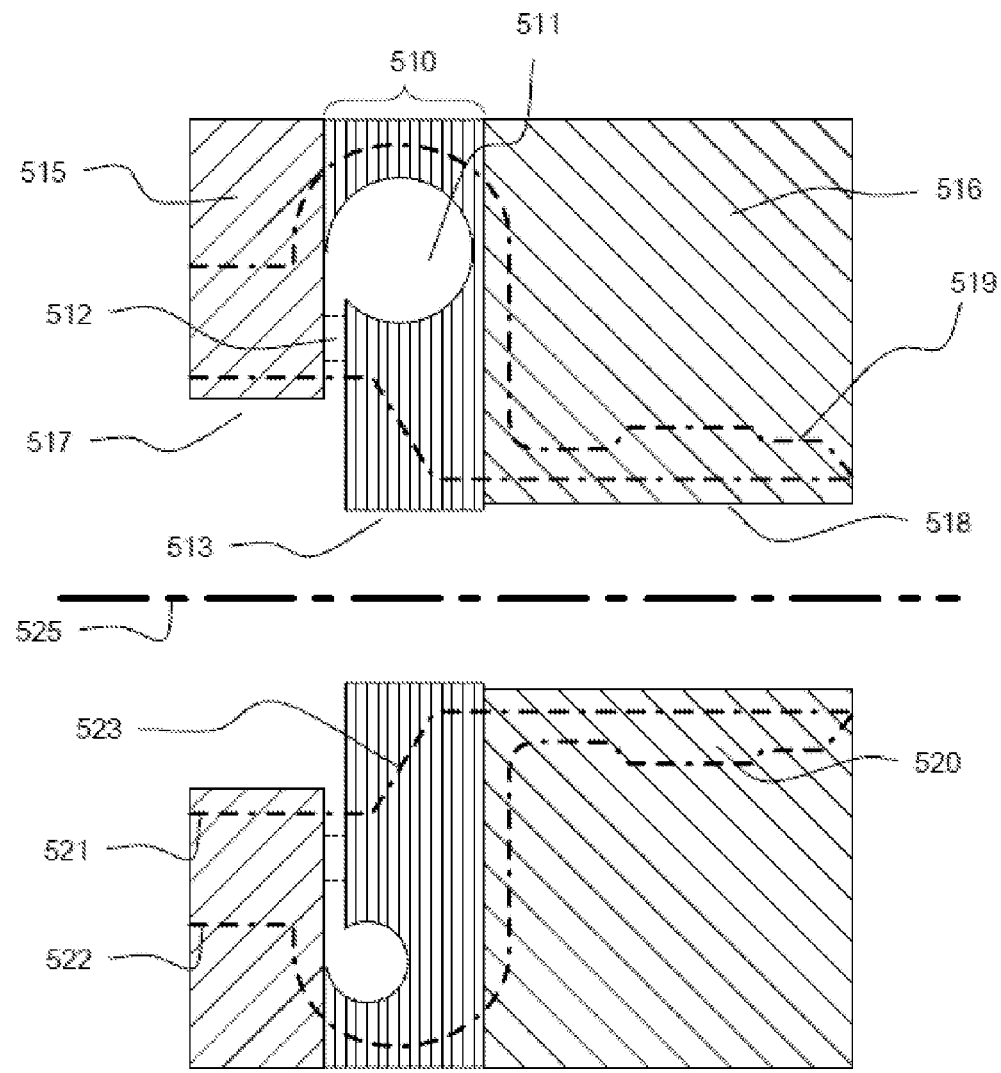
FIG. 5a illustrates an example cross section of a static structure of a turbomachine made from stacking and bonding metal foil sheets to define internal flow structures, in accordance with one embodiment.

FIG. 5 represents an example static structure, according to one embodiment: a pump discharge volute. FIG. 5a illustrates an example cross section of an example pump discharge volute of a turbomachine. The static structure is manufactured by stacking and bonding metal foil sheets such that the sheets form planes perpendicular to the axis of rotation 525 of the rotating elements within the static structure. In one embodiment, the sheets are etched to define the internal flow features of the primary working fluid. In one embodiment, these flow features include the collection volute 511, central hole 513, and diffusion section 512, which in some embodiments will include internal blading. In one embodiment, additional solid blocks of material 515, 516, with central holes 517, 518, are stacked on either side of the sheets 510, and the whole stack is bonded together. In one embodiment, material is removed to contour 519, creating inlet fitting 520, mating surfaces 521 and 522 for mounting to other parts of the static structure, and impeller contour 523.

Figure 5B:
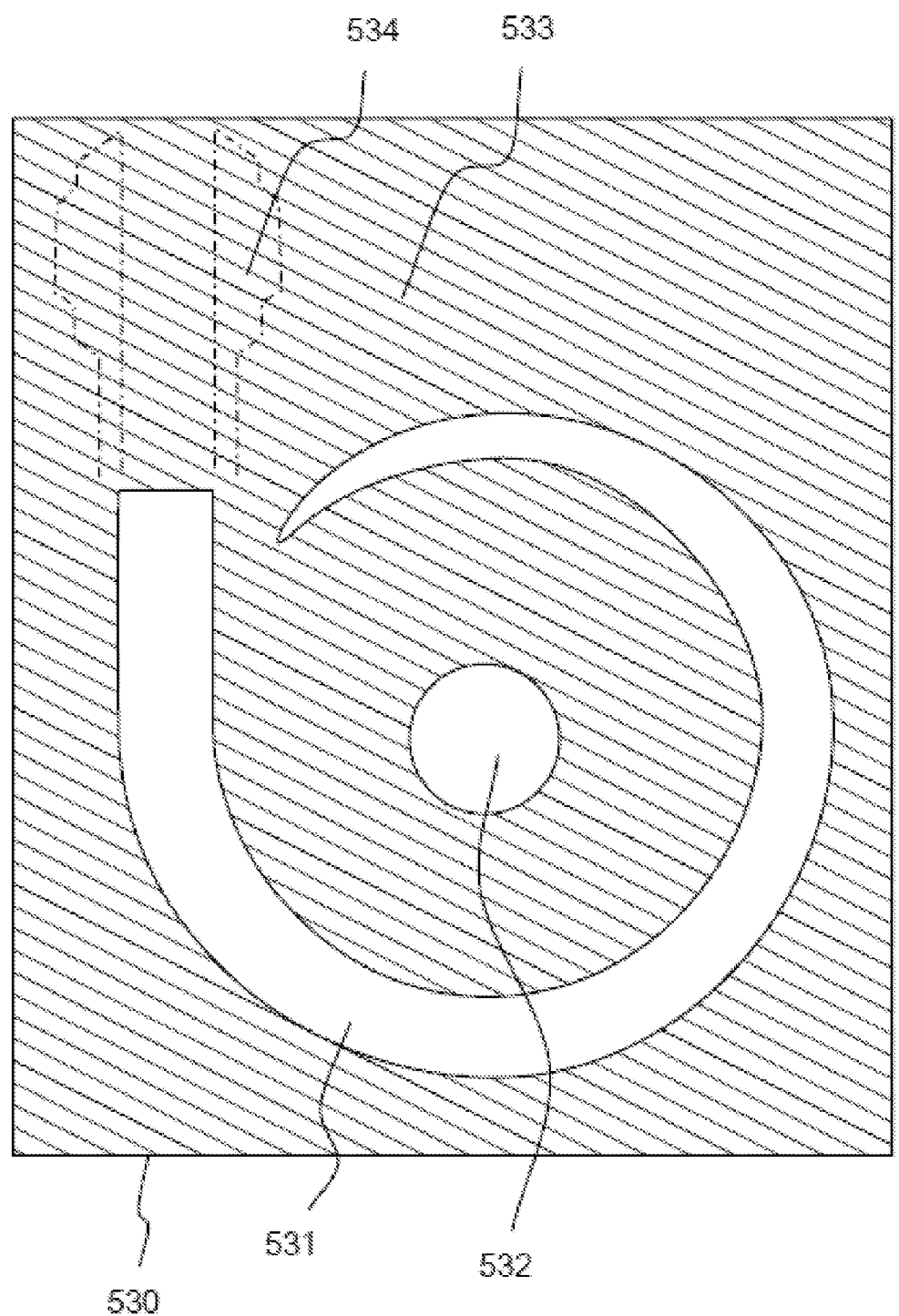
FIG. 5b illustrates a sample sheet for creating a static structure pump discharge volute, according to one embodiment.

FIG. 5b illustrates a sample sheet for creating a static structure pump discharge volute, according to one embodiment. The volute shape 531 is included, as is central hole 532. Additional material 533 is left on one edge of the sheet to allow sufficient material to add pump outlet fitting 534 during final machining.

Figure 5C:
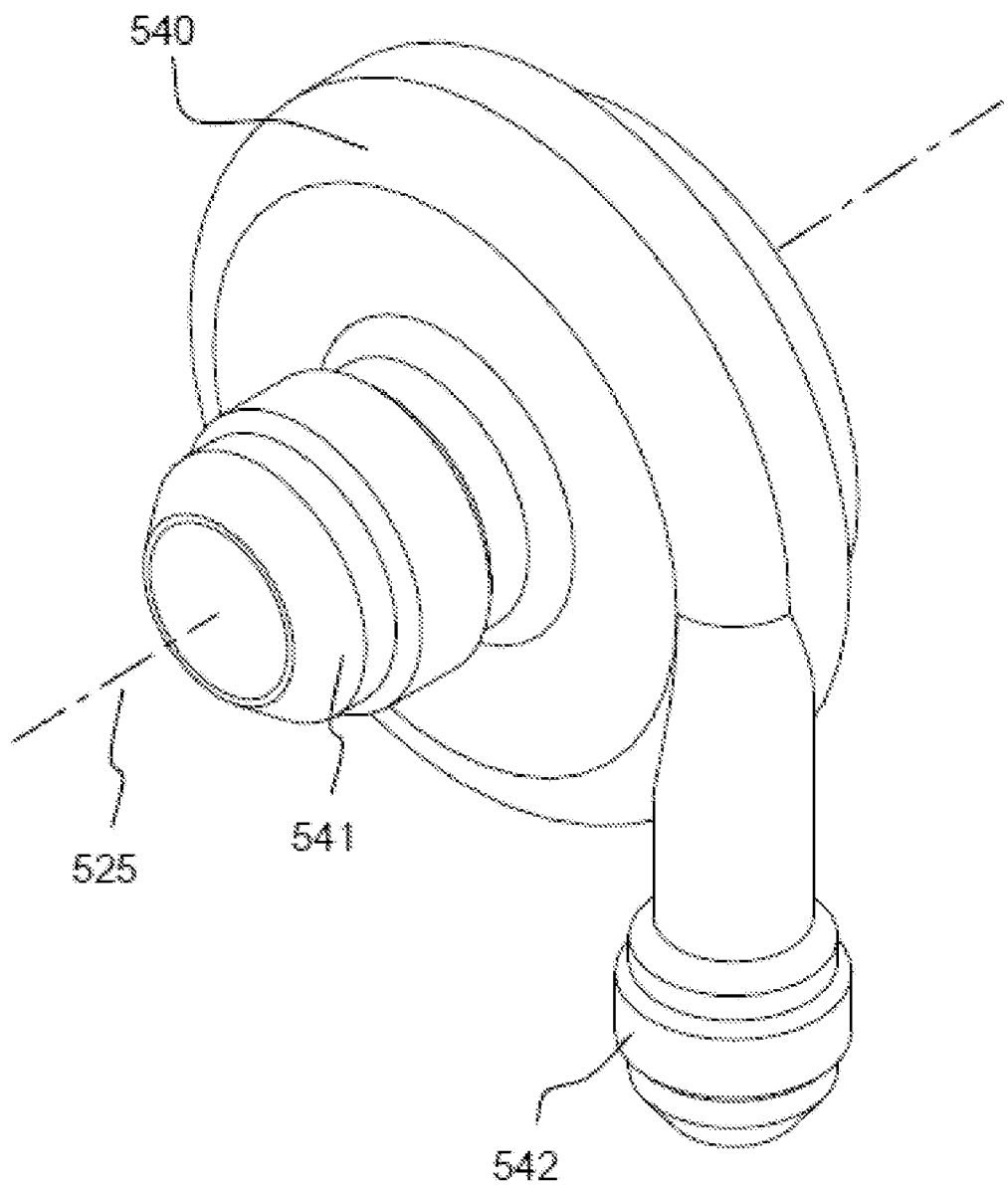
FIG. 5c illustrates a static structure of a turbomachine after excess material has been removed, whereby the static structure is made from stacking and bonding metal foils sheets, according to one embodiment.

FIG. 5c illustrates a sample static structure pump discharge volute 540, according to one embodiment. The inlet fitting 541 receives the fluid into the turbomachine, and the outlet fitting 542 discharges the pressurized fluid. Rotating elements fit within the static structure, rotating about rotation axis 525.

Figure 6:
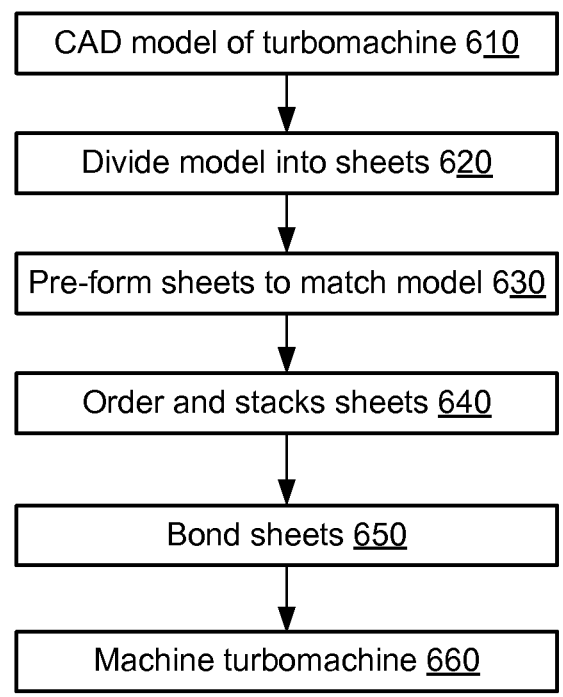
FIG. 6 illustrates a flow diagram for a process for manufacturing rotating elements and static structure of a small scale, high speed turbomachine, according to one embodiment.

FIG. 6 illustrates a flow diagram for a process for manufacturing rotating elements and static structure of a small scale, high speed turbomachine, according to one embodiment. The process for manufacturing a turbomachine and any additional stationary elements takes as an input 610 a design for a turbomachine, for example a Computer Aided Design (CAD) drawing or other three-dimensional representation of the turbomachine including its constituent rotating and non-rotating elements. The turbomachine is divided up 620 into two dimensional sheets, each representing a cross section of the turbomachine or an element of the turbomachine at an appropriate plane or circular or conical or other axisymmetric shell. Each sheet has a specified thickness. The sheets are pre-formed 630 into the cross section of the rotating element from the design drawing through etching or machining, or another suitable process. The sheets are separated from each other, and are ordered and stacked 640 so as to reproduce the structure of the turbomachine. The stack of sheets is bonded 650 together to bind the sheets together into a single component. The stack may be fusion bonded under heat and pressure, diffusion bonded, or brazed, depending upon the embodiment. The device is machined 660 to create any additional stationary elements and to form the turbomachine into the desired shape. In one embodiment, the machining may include electro-discharge machining (EDM).

Blading with Integral Cooling Components

Turbomachines frequently operate at high temperatures. A turbomachine exposed to a temperature above a certain threshold may work less efficiently or cease to work entirely. This may be due to a number of different reasons. For example, materials making up the blading, shrouding, housing, or central portions of the rotating element may melt or lose strength at the temperature of the fluid passing through them. Also, thermal expansion of the materials making up the blading, shrouding, and/or housing may cause the clearance between blading and shrouding or housing to decrease or increase in size. A change in the clearance may decrease the efficiency of the turbomachine. If the gap closes entirely, the turbomachine may cease functioning.

Large turbomachines incorporate integrated cooling features that allow the rotating elements to process fluids with higher temperatures than would be possible if the rotating elements were uncooled. The cooling features are designed to keep the rotating structure temperature well below the temperature of the working fluid. As turbomachines get smaller, it is more difficult to incorporate integrated cooling features which can assist in cooling the turbomachine at high temperature operation. However, the use of bonded metal sheets makes it possible to incorporate integrated cooling features in many embodiments, even at small scales.

In one embodiment, the etched metal foil sheets used to construct the rotating elements include features that, once stacked and bonded, create cooling flow passages within the structure and blades of the rotating element. In one embodiment, the sheets include features that result in porous blading designed to receive and distribute a cooling fluid within the rotating element. In one embodiment, the stationary elements of the turbomachine include passages for a cooling fluid to pass nearby and cool the stationary element.

Figure 7A:
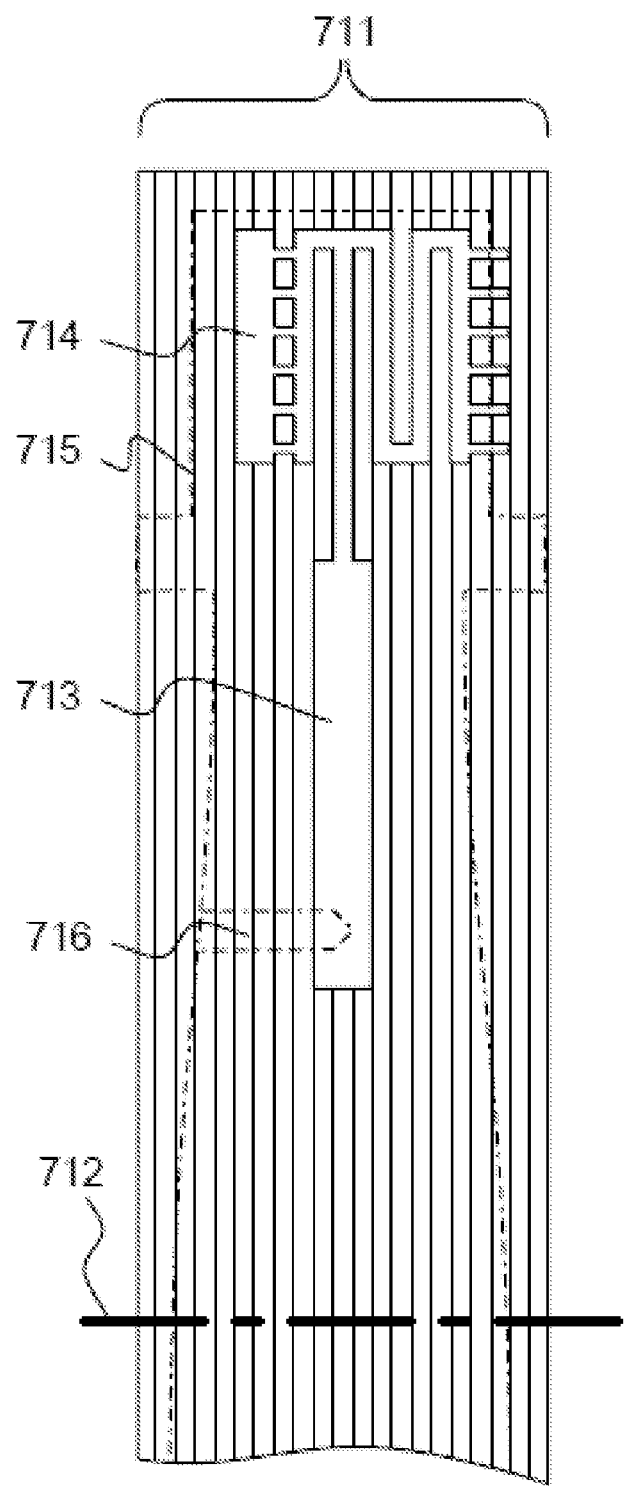
FIGS. 7a and 7b illustrate example cross sections of a rotating element of a turbomachine that includes internal cooling features, where the rotating element and the internal cooling features area made from stacking and bonding metal foil sheets, according to one embodiment.
Figure 7B:
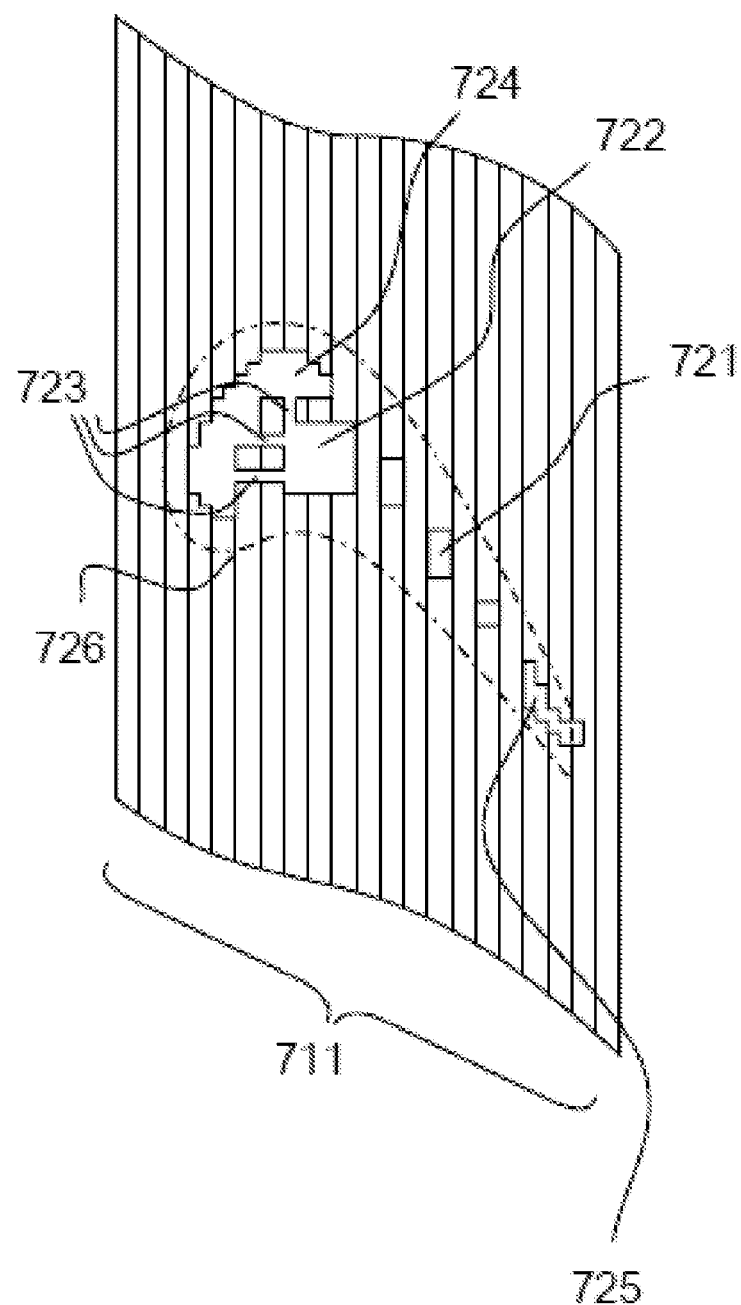

FIGS. 7a and 7b illustrate cross sections of a rotating element of a turbomachine manufactured by stacking and bonding metal foil sheets 711 such that the sheets form planes perpendicular to the axis or rotation 712, and the sheets include features 713, 714 for cooling the rotating element. In one embodiment, the rotating element will be an internally cooled axial-flow turbine. In one embodiment, after bonding excess material will be removed to contour 715 to define the blading and turbine disk, as well as to provide access ports 716 for the internal cooling fluid.

FIG. 7b illustrates a cross section through the cooling features 714, according to one embodiment. In one embodiment, cooling features includes cooling passages 721 and 722, passages 723 for forming jets into internal cavity 724 for impingement cooling of the blade leading edge, and trailing edge slots 725 for directing the cooling air into the main flow path. The external contour 726 of the blade is shown according to one embodiment. The cooling features illustrated in FIG. 7B appear coarser and rougher than they would be in most embodiments, since many more sheets can be used than can be illustrated successfully, so there will be substantially higher out-of-sheet-plane resolution within the cooling structures.

Figure 7C:
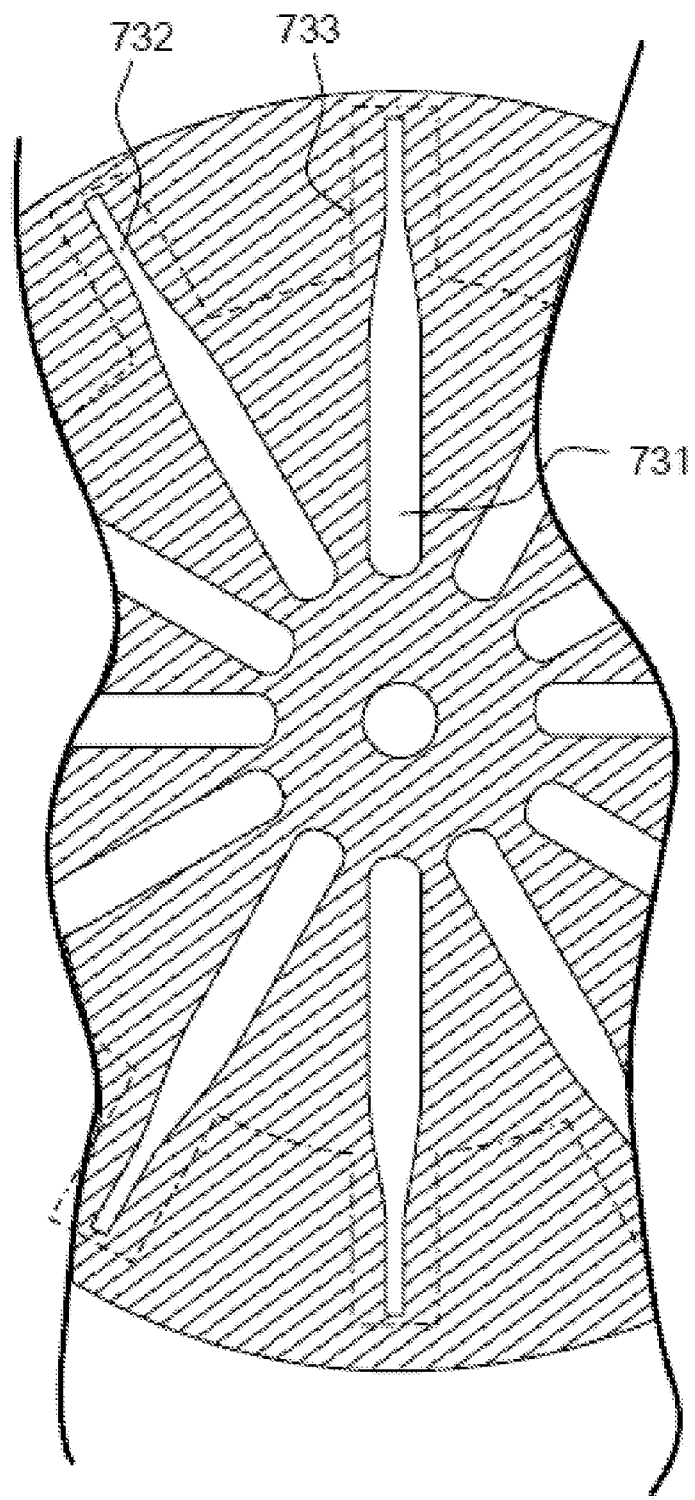
FIG. 7c illustrates a portion of an example foil sheet prior to stacking, where the example foil sheets include features used for internal cooling, according to one embodiment.

FIG. 7c illustrates a sample sheet used to manufacture the internally cooled axial-flow turbine, according to one embodiment, and includes coolant distribution channels 731, and blade cooling passage 732. A contour 733 for removing material to define the blades and flowpath geometry is also illustrated for one embodiment.

In additional embodiments, cooling features are incorporated into radial in-flow and radial out-flow turbines, static structures including turbine inlet guide vanes, as well as into axial turbines manufactured using sheets formed into cylindrical shells. In some embodiments there are performance advantages because the sheets are in planes approximately parallel to the flow direction and allow for additional geometrical complexity in defining shapes within the planes of the sheets.

Figure 7D:
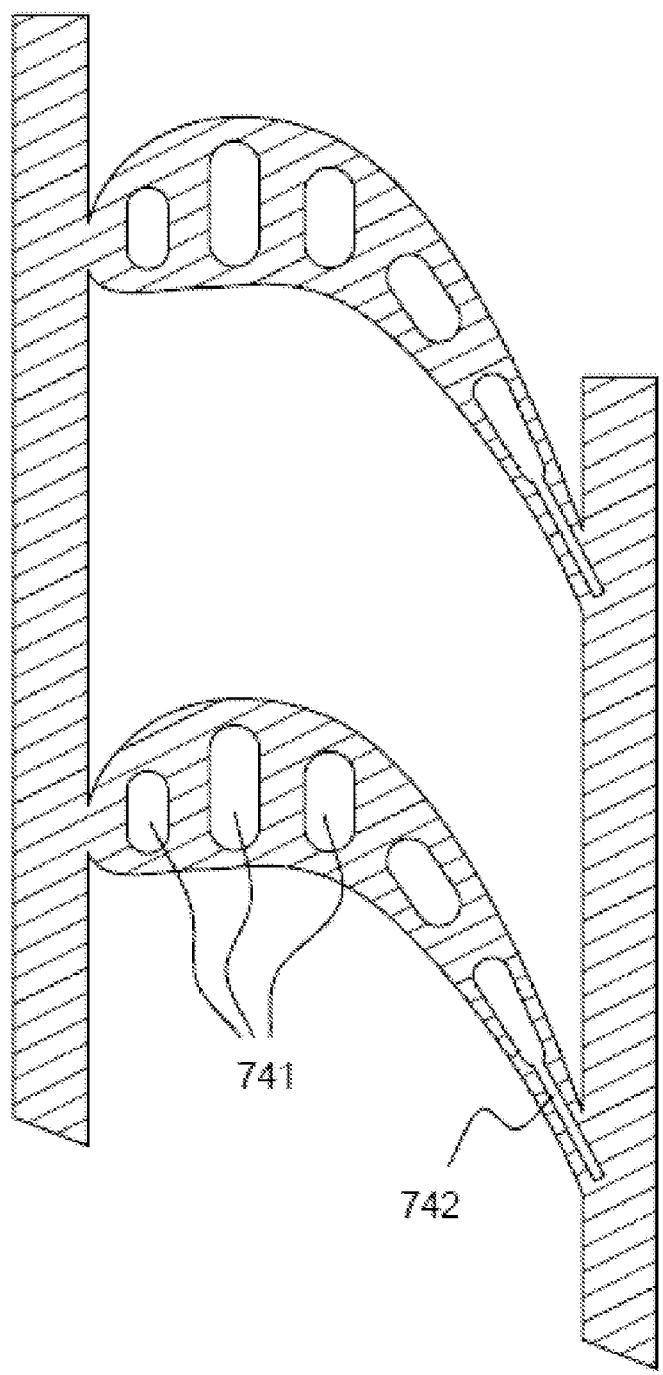
FIGS. 7d and 7e illustrate portions of example foil sheets prior to stacking, where the example foil sheets include features used for internal cooling, according to other embodiments.
Figure 7E:
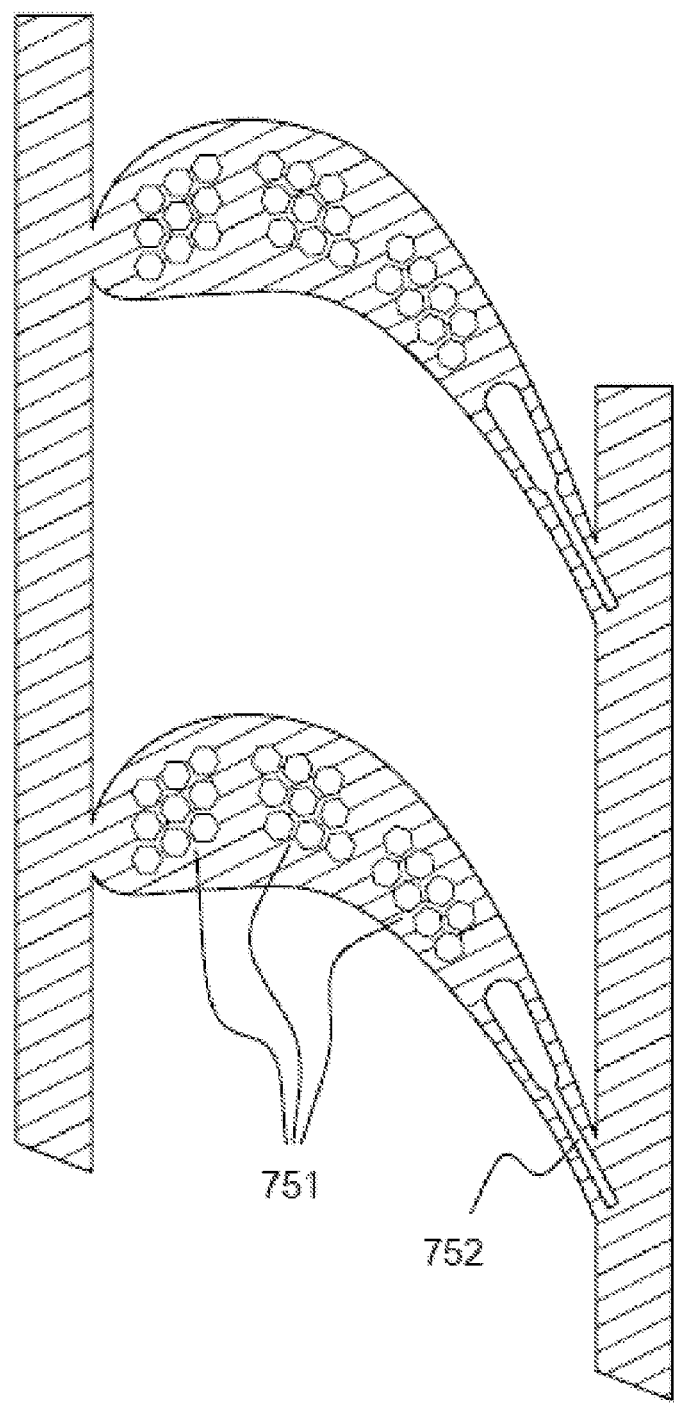

FIGS. 7d and 7e illustrate examples of this increased flexibility. FIG. 7d shows cooling passages 741 and trailing edge slot 742, in one embodiment. In one embodiment, FIG. 7e shows porous structures 751 serving as cooling passages, where increased internal surface area and increased flow turbulence enhances cooling. FIG. 7e also shows trailing edge slot 752.

Static Structure

Other examples of static structures which may be part of a turbomachine may also include blading for exit vanes used in a diffuser located downstream of a rotating element, blading for turbine inlet vanes upstream from a turbine inlet, inlet or outlet volutes, and sealing elements. Static structures to be used in conjunction with the small scale turbomachine may also be manufactured separately from the turbomachine using the same process.

The process described used to create the turbomachine may be altered into order to fabricate bearing journals. Fabricating bearings allows the turbomachine to incorporate fluid bearings. Examples of fluid bearings include hydrostatic, hydrodynamic, or film bearings.

For very small turbomachinery, in some embodiments it will be advantageous to include partial emission pumps or compressors or partial admission turbines. These types of turbomachinery involve static structures where a portion of the inlet flow annulus (for turbines) or the outlet flow annulus (for pumps/compressors) is blocked so as to restrict flow. In one embodiment, a partial emission static structure is created by closing a portion of diffusion area 512 (in FIG. 5a) such that flow can only enter the volute over a fraction of the receiving circumference.

Labyrinth Seals

Figure 8A:
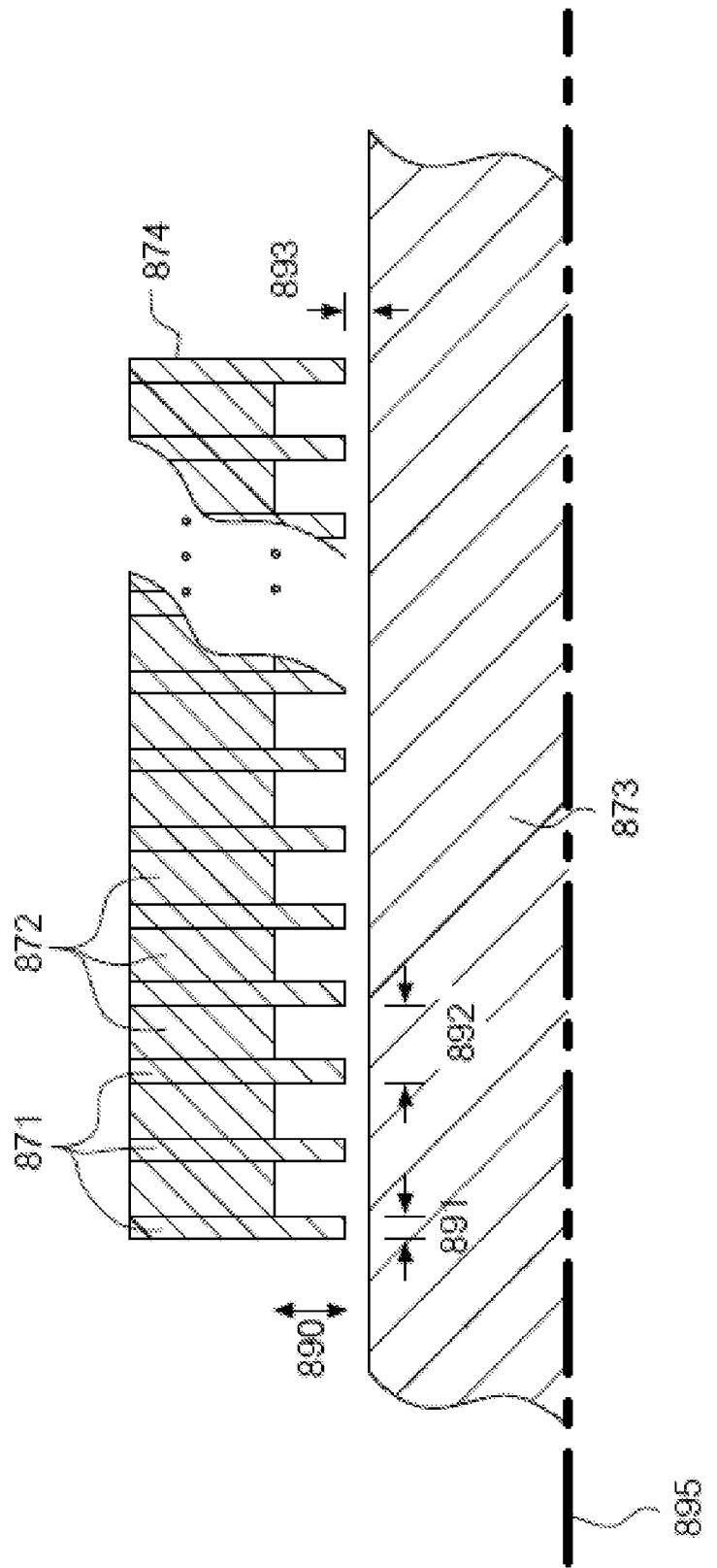
FIGS. 8A, 8B, and 8C illustrate examples of labyrinth seals in accordance with several different embodiments.

In some embodiments, it may be beneficial to use labyrinth type seals to prevent excessive fluid leakage. FIG. 8A illustrates a labyrinth seal in accordance with one embodiment. The labyrinth seal includes a smooth rotating element 873, rotating about axis 895 placed in close proximity to stationary element 874 which includes a number of repeating teeth. In one embodiment, the teeth are created by alternately layering a number of thinner layers of a material 871 with a number of thicker layers of a similar material 872. In one embodiment, a typical thickness of a thinner layer would be approximately 0.002 inches, and a typical thickness of a thicker layer would be approximately 0.008 inches, such that the number of teeth per inch is approximately 100. Alternating thick and thin layers allows for a large number of teeth per length of seal, which facilitates improved sealing compared to conventional labyrinth seals. In another embodiment, rotating element 873 may be the shaft of the turbomachine, a sleeve of the shaft, or a material inserted onto the shaft. The rotating element may be made from a different material than the remainder of the turbomachine. In one embodiment, rotating element 873 is made of PTFE.

The labyrinth seals may be defined by a number of parameters. The length 890 indicates the length of the teeth 871 of the labyrinth seal. The thickness 891 indicates the thickness of the teeth 871. The pitch 892 indicates the distance between teeth 871. The gap 893 is the distance between the rotating element 873 and the stationary element 874.

Figure 8B:
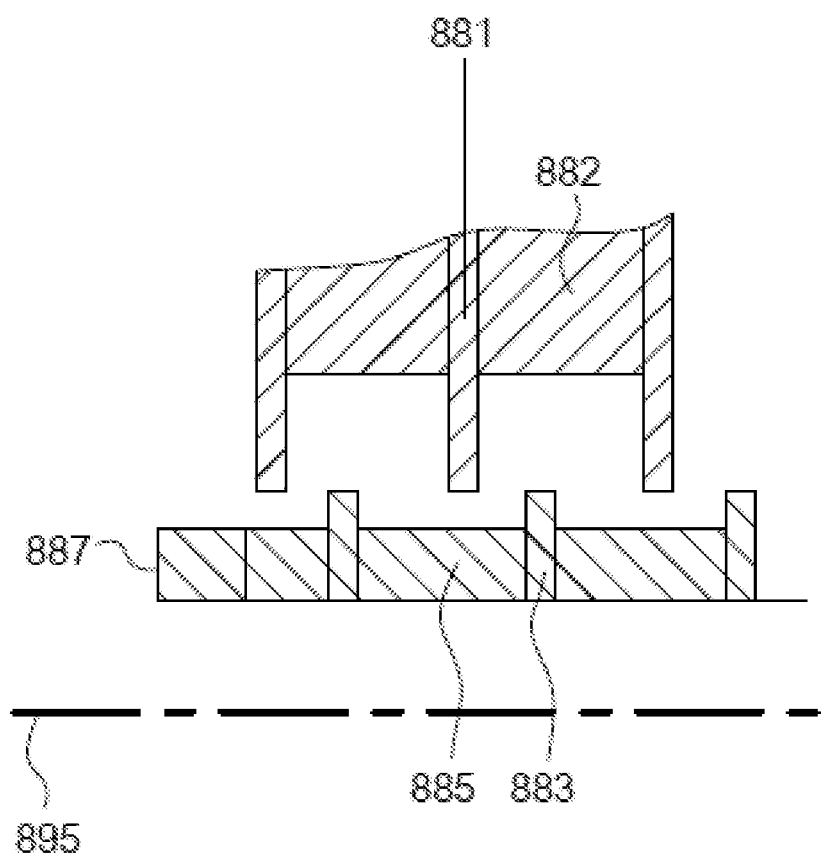
Figure 8C:
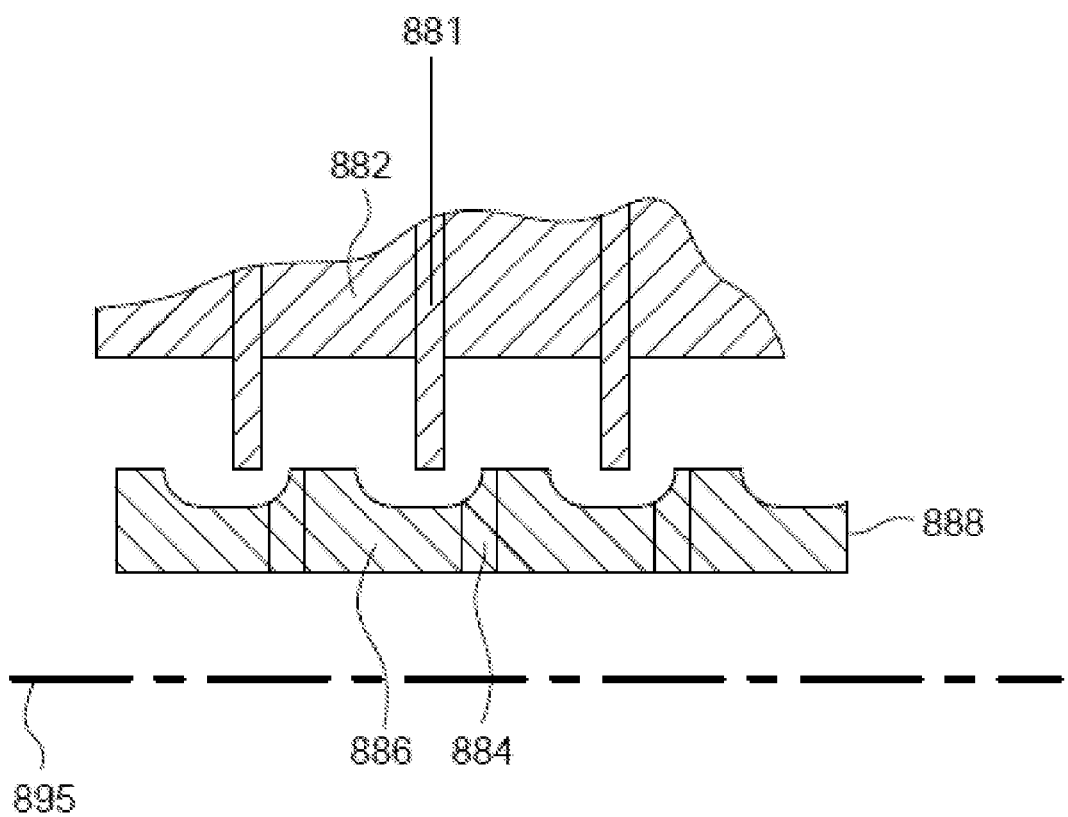

FIGS. 8B and 8C illustrate labyrinth seals according other embodiments. The labyrinth seal includes stationary elements 881 and 882 placed in contact with rotating elements 887 and 888. The labyrinth seals of FIG. 8 include a set of teeth for each of the stationary and rotating elements. Smaller teeth on the rotating elements 887 and 888 may be created by stacking thin layers 883 and 884 with thick layers 885 and 886 of similar thicknesses. The smaller teeth are smaller relative to their counterparts on the stationary elements. The smaller teeth are aligned axially such that the smaller teeth are located in between the longer teeth of the stationary element. Interlacing the teeth in this manner improves seal performance by diverting the path of fluid as it is leaking through the seal. In one example, the teeth divert leaking fluid away from an upstream seal gap away from the next seal gap.

Additional Considerations

In the above description, turbomachines are described as acting upon various fluids such as the working fluid and the turbine drive fluid. The described embodiments also function with gases as well as liquids. In some cases, taller blading may be used if the turbomachine is operating on a gas in order to adjust for reduced density versus a liquid substance. However, the concepts disclosed herein remain the same regardless of which type of substance is used.

Generally, the turbomachines may be constructed from any solid material which approximately maintains its structure when the turbomachine is operated at high speed, high temperature, and/or high pressure. The description above makes use of the term "metal foil sheets," however a turbomachine manufactured according to embodiments of the invention may be made from a variety of materials, including different metals, metal alloys, other compounds that include metal elements, plastics or other organic compounds. Example metals from which the turbomachine may be constructed include stainless steel, nickel, nickel-based alloys, titanium, titanium-based alloys, brass, aluminum, or aluminum-based alloys.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A process for manufacturing a rotating element of a turbomachine, the method comprising:
   pre-forming a plurality of sheets of a material, each sheet comprising a cross section of the rotating element of the turbomachine;
   stacking the sheets in an order to reproduce a structure of the rotating element;
   bonding the sheets together to form the rotating element therewithin; and
   removing an amount of excess material from the bonded sheets to free the rotating element therefrom,
   wherein stacking the sheets in an order to reproduce the structure of the rotating element comprises stacking the sheets at an angle that is not 0 or 90 degrees with respect to the axis of the rotating element.

2. A process for manufacturing a rotating element of a turbomachine, the method comprising:
   pre-forming a plurality of sheets of a material, each sheet comprising a cross section of the rotating element of the turbomachine;
   stacking the sheets in an order to reproduce a structure of the rotating element;
   bonding the sheets together to form the rotating element therewithin; and
   removing an amount of excess material from the bonded sheets to free the rotating element therefrom,
   wherein stacking the sheets in an order to reproduce the structure of the rotating element comprises forming the sheets into axisymmetric shells prior to bonding.

3. A turbomachinery component configured to rotate during operation, comprising:
   a plurality of preconfigured metal sheets that when bonded together define a hub, a shroud, a plurality of blades, and a plurality of fully formed primary flow paths for pumping or compressing a working fluid or gas or for extracting energy from the working fluid or gas,
   wherein the plurality of blades extend from the hub to the shroud and are integrally formed with the hub and the shroud by the bonded metal sheets,
   wherein the plurality of preconfigured metal sheets are stacked at an angle that is not 0 degrees and not 90 degrees with respect to a centerline axis of the hub.

4. A turbomachinery component configured to rotate during operation, comprising:
   a plurality of preconfigured metal sheets that when bonded together define a hub, a shroud, a plurality of inducer blades, a plurality of impeller blades, and a plurality of fully formed primary flow paths for pumping or compressing a working fluid or gas or for extracting energy from the working fluid or gas,
   wherein the plurality of inducer blades and the plurality of impeller blades extend from the hub to the shroud and are integrally formed with the hub and the shroud,
   wherein the plurality of preconfigured metal sheets are stacked at an angle that is not 0 degrees and not 90 degrees with respect to a centerline axis of the hub.

5. A turbomachinery component configured to rotate during operation, comprising:
   a plurality of preconfigured metal sheets that when bonded together define a hub, a shroud, a plurality of blades, and a plurality of fully formed primary flow paths for pumping or compressing a working fluid or gas or for extracting energy from the working fluid or gas,
   wherein the plurality of blades extend from the hub to the shroud and are integrally formed with the hub and the shroud by the bonded metal sheets, wherein at least one of the preconfigured metal sheets defines a portion of each of the hub, the shroud, the plurality of blades, and the plurality of fully formed primary flow paths, wherein a discharge diameter of the blades is 0.4 inches to 3 inches, wherein a blade height of each of the blades at the discharge diameter is 0.1 inch or less, wherein the blade height of each of the blades varies from an inlet end to a discharge end of the blades, wherein the plurality of preconfigured metal sheets are stacked at an angle that is not 0 degrees and not 90 degrees with respect to a centerline axis of the hub.

* * * * *